(12) United States Patent
Ogasawara

(10) Patent No.: US 6,748,165 B2
(45) Date of Patent: Jun. 8, 2004

(54) PHOTOGRAPHING SYSTEM AND PHOTOGRAPHIC INFORMATION TRANSMISSION SYSTEM

(75) Inventor: Akira Ogasawara, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/072,888

(22) Filed: Feb. 12, 2002

(65) Prior Publication Data

US 2002/0127019 A1 Sep. 12, 2002

(30) Foreign Application Priority Data

Feb. 16, 2001 (JP) .................................... 2001-040089
Jan. 22, 2002 (JP) .................................... 2002-012690

(51) Int. Cl.[7] ...................... G03B 17/00; G03B 15/03
(52) U.S. Cl. ............................... 396/56; 396/182
(58) Field of Search ................... 396/56, 57, 182, 396/661, 189

(56) References Cited

U.S. PATENT DOCUMENTS 5,500,639 A * 3/1996 Walley et al. ......... 340/539.19
2002/0009296 A1 * 1/2002 Shaper et al. ................. 396/56

* cited by examiner

Primary Examiner—Rodney Fuller
Assistant Examiner—Arthur A Smith
(74) Attorney, Agent, or Firm—Oliff & Berridge, PLC

(57) ABSTRACT

A photographing system in which a camera and a flash device cooperate to perform flash photographing and a photographic information transmission system in which a second hand-held terminal such as a flash device is controlled based on a signal relating to photographing that is transmitted from a first hand-held terminal such as a camera to the second hand-held terminal. A unique identification code for identification of the first hand-held terminal or the second hand-held terminal is provided in at least one of the first hand-held terminal and the second hand-held terminal. The second hand-held terminal has a collating program for collating a unique identification code that is transmitted from the first hand-held terminal by using radio waves as a medium with a unique identification code provided in the second hand-held terminal.

20 Claims, 20 Drawing Sheets

FIG. 12 MAIN FLASHING

FIG. 13
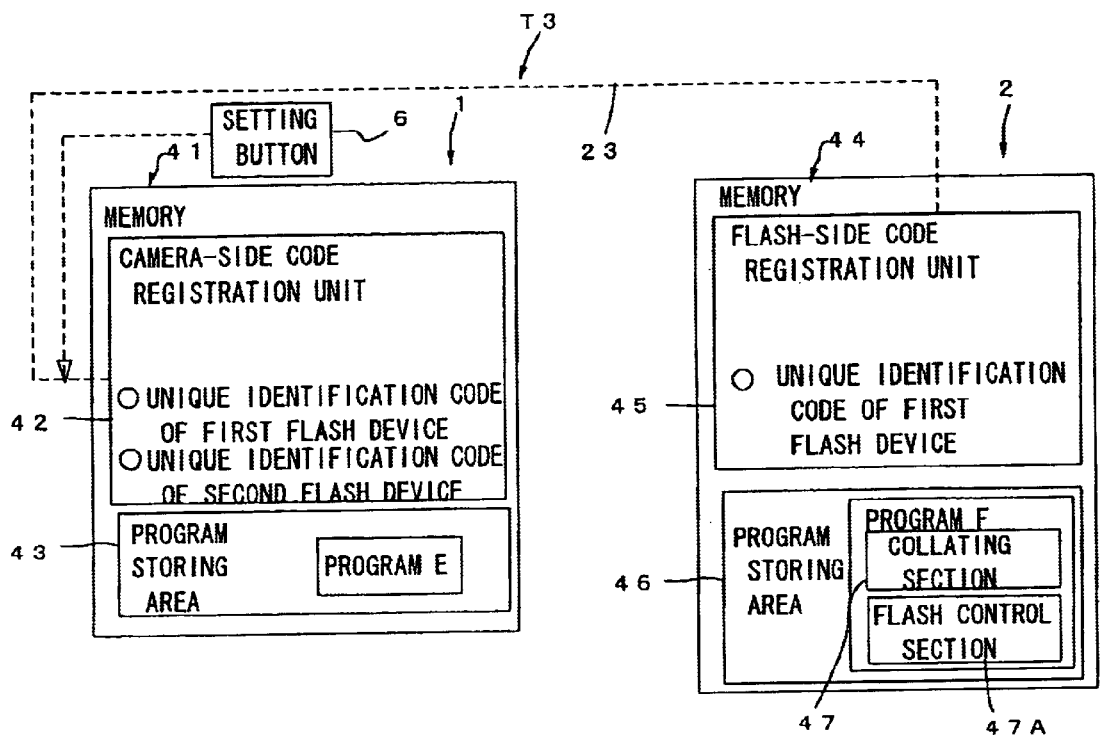
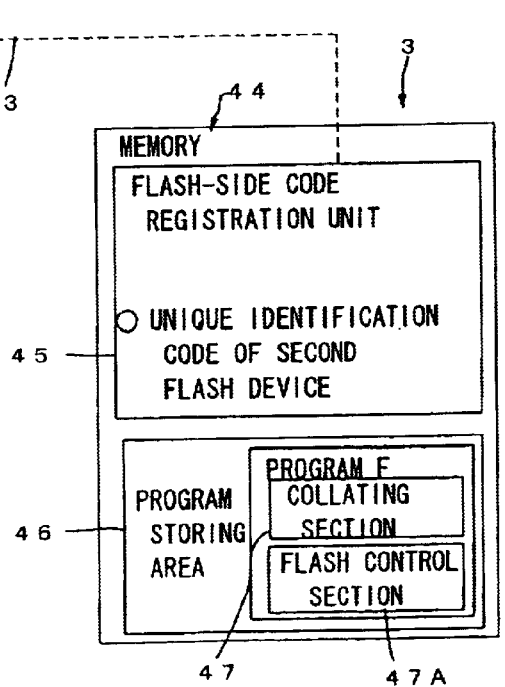

PRELIMINARY FLASHING

PRELIMINARY FLASHING

PRELIMINARY FLASHING

PHOTOGRAPHING SYSTEM AND PHOTOGRAPHIC INFORMATION TRANSMISSION SYSTEM

BACKGROUND OF THE INVENTION

1. Field of the Invention

The present invention relates to a photographing system in which flash photographing is performed in such a manner that a camera and a flash device cooperate with each other, and also relates to a photographic information transmission system in which a first hand-held terminal such as a camera sends a signal relating to photographing to the second hand-held terminal to control a second hand-held terminal such as a flash device.

2. Description of the Related Art

Nowadays, cameras are used in various manners. For example, flash photographing is performed in such a manner that a camera cooperates with an additional device such as a flash device, and photographic data of a camera is sent to a cellular phone. In doing such operations, a photographic information transmission system is used which interconnects a first hand-held terminal such as a camera and a second hand-held terminal such as a flash device.

As an example of such a photographic information transmission system, a photographing system in which a camera and a flash device cooperate with each other to perform flash photographing will be described below.

In this type of photographing system, a common setup is such that a flash device is directly attached to the hot shoe of a camera or that a flash device is connected to the hot shoe of a camera by a cable so that the camera and the flash device are separated from each other by several meters.

In particular, flash photographing with sophisticated lighting is sometimes performed in such a manner that an extension cable is branched so as to connect a plurality of flash devices to a single camera and the flash devices are caused to flash simultaneously with their quantities of flash set independently. In this type of photographing system, it is necessary to use an extension cable having a lot of branches (and subbranches) to connect a plurality of flash devices to a single camera; cumbersome setup work is necessary.

In view of this, recently, a photographing system has been put into practical use in which flash control is performed wirelessly without using any extension cables between a camera and a plurality of flash devices (wireless communication using a flash pulse train is performed).

FIG. 23 to FIG. 25 show an example of such a photographing system, which will be described below.

In this photographing system, flash photographing is performed in the following manner. A master flash device 101 provided between a camera 102 and a plurality of flash devices 103 and 104 generates, as a communication means, a flash pulse train consisting of flash pulses having very small quantities of flash, which is sent from the master flash device 101 to the flash devices 103 and 104.

In this photographing system, preset information is correlated with pulse intervals of a flash pulse train. Information is sent from the camera 102 to the flash devices 103 and 104 being carried by a flash pulse train. In response, the flash devices 103 and 104 emit preliminary flashes and main flashes.

The preliminary flashing and the main flashing will be described below.

(1) Preliminary Flashing

The preliminary flashing will be described with reference to FIG. 24.

FIG. 24 shows a relationship between flash pulse trains generated by the master flash device and preliminary flashes emitted by the flash devices 103 and 104. Specifically, FIG. 24(a) shows flash pulse trains generated by the master flash device 101. FIG. 24(b) shows timing with which the master flash device 101 generates flash pulses. FIG. 24(c) shows timing with which the first flash device 103 emits a preliminary flash. FIG. 24(d) shows timing with which the second flash device 104 emits a preliminary flash.

In this photographing system, the master flash device 101 sends an identifying signal of the camera 102 to the first and second flash devices 103 and 104 prior to photographing.

The first and second flash devices 103 and 104 has recognized an identifying signal of the master flash device 101 in advance so as to function in response to the identifying signal sent from the master flash device 101.

In sending an identifying signal of the camera 102 itself to the first and second flash devices 103 and 104, the master flash device 101 selects, as the identifying signal, one of a plurality of channels (i.e., combinations of presence and absence of a flash pulse (for a plurality of expected flash pulses)). The first and second flash devices 103 and 104 have the same selecting function, and the same channel as set in the master flash device 101 is set in the first and second flash devices 103 and 104.

In FIG. 24(a), symbol P1 denotes a flash pulse train of a command of an identifying signal generated by the master flash device 101. An expected cycle t of generation of flash pulses is predetermined. In the pulse train P1, four flash pulses are generated at maximum. The first and second flash pulses are always generated for prevention of a malfunction and recognition of a start of communication. Four master flash devices 101 can be recognized by combinations of presence and absence of the third and fourth flash pulses (in FIG. 24(a), a solid-line flash pulse indicates "on" and a broken-line flash pulse indicates "on" or "off"). One of the four combinations is selected and determined as an identifying signal of the camera 102.

A pulse train P2 shown in FIG. 24(a) is a flash pulse train to be used for selecting a particular one of a plurality of flash devices (i.e., the first and second flash devices 103 and 104). An identifying signal corresponding to each flash device is selected because a plurality of flash devices may exist. In the pulse train P2 four combinations of flash pulses are possible depending on presence and absence of a flash pulse (for two expected flash pulses) and hence can specify four flash devices. An identifying signal of a flash device is specified to determine one flash device from the four.

Synchronization is established at the first flash pulse of a flash pulse train such as the pulse train P1 or P2 shown in FIG. 24. The first flash device 103, for example, detects presence/absence of a flash pulse in every expected cycle t. When detecting a flash pulse block such as the pulse train P1 or P2 shown in FIG. 24, the first flash device 103 judges whether the master flash device 101 is selected and whether the first flash device 103 itself is selected.

Then, the master flash device 101 sends a command (i.e., a flash pulse train P3 shown in FIG. 24) for causing only the selected first flash device 103 to emit a flash of a small quantity.

Immediately thereafter, the selected first flash device 103 emits a preliminary flash of a predetermined quantity as shown in FIG. 24(c). The preliminary flash is detected by a light-receiving element of the camera 102 via a photographic lens (not shown).

Each of the first and second flash devices 103 and 104 does not respond any more unless its own identifying signal is newly selected. Therefore, in newly sending a pre-flash command to another flash device, the master flash device 101 needs to send pulse trains P4–P6 as shown in FIG. 24(*a*). In response to the pulse trains P4–P6, the second flash device 104 emits a preliminary flash. The pulse trains P4–P6 correspond to the respective pulse trains P1–P3 for the first flash device 103.

The interval between the pulse trains P1–P6 is set at least two times the duration of each flash pulse.

In this manner, the master flash device 101 sends pre-flash instructions in order to the first and second flash devices 103 and 104 and the first and second flash devices 103 and 104 emit preliminary flashes as shown in FIGS. 24(*c*) and 24(*d*).

The camera 102 calculates quantities of flashes to be emitted in main flashing based on quantities of reflected light from an object which is produced by reflecting the preliminary flashes and is detected in the preliminary flashing shown in FIG. 24.

(2) Main Flashing

FIG. 25 shows a relationship between flash pulse trains generated by the master flash device 101 and main flashes emitted by the flash devices 103 and 104. Specifically, FIG. 25(*a*) shows flash pulse trains generated by the master flash device 101. FIG. 25(*b*) shows timing with which the master flash device 101 generates flash pulses. FIG. 25(*c*) shows timing with which the first flash device 103 emits a main flash. FIG. 25(*d*) shows timing with which the second flash device 104 emits a main flash.

In the main flashing, as shown in FIG. 25(*a*), the master flash device 101 sends flash pulse trains to the flash devices 103 and 104 as main flash commands.

FIG. 25 shows flash pulse trains for informing each of the flash devices 103 and 104 about a main flash quantity in the same manner as in the preliminary flashing. In this example, to discriminate the flash pulse trains for the main flashing from those for the preliminary flashing, codes are used that do not cause two or more consecutive absences of a flash pulse in each flash pulse train. In this manner, each of the flash devices 103 and 104 is selected and a main flash quantity is specified individually.

At the end of the commands, the master flash device 101 does not generate a flash pulse at two consecutive expected flash time points and then generates one flash pulse at one expected flash time point. Each of the flash devices 103 and 104 recognizes the end of the main flash command when detecting such a sequence of flash pulses.

When recognizing the end of the main flash command, the flash devices 103 and 104 emit main flashes simultaneously at the specified flash quantity after a very short delay time.

In this photographing system, as described above, the master flash device 101 sends an identifying signal of the camera 102 to the first and second flash devices 103 and 104, whereby the first and second flash devices 103 and 104 are prevented from flashing in response to a flash pulse train of the camera (not shown) of another photographing system.

However, in a case where a lot of photographers simultaneously use various photographing systems, in which wireless communications are performed using flash pulse trains, at positions close to each other in occasions such as news reporting, the following problems arise because the camera 102 uses flash pulse trains as a means for communicating pre-flash commands and main flash commands.

Where many photographing systems of the above kind are used, it is not always expected that an identifying signal of the master flash device in the photographing system of another photographer is different from that of the master flash device 101 in the self photographing system. Where the photographers use the same photographing systems, the number of identifying channels to be used for the flash devices 103 and 104 to recognize the master flash device 101 of the photographing system they belong to may be insufficient. In the above conventional example, in the pulse train P1 shown in FIG. 24(*a*), the number of identifying channels is restricted to four as combinations of presence and absence of a flash pulse (for two expected flash pulses) is four.

Insufficiency in the number of identifying channels may cause a problem that during flash photographing the first and second flash devices 103 and 104 of the photographing system erroneously respond to flash pulse trains generated by the master flash device (not shown) of another photographing system or that the flash devices of another photographing system erroneously respond to flash pulse trains generated by the master flash device 101 of the photographing system.

Increasing the number of flash pulses naturally increases the number of identifying channels of the master flash device. However, this is not preferable because generation of more flash pulses increases the power consumption. The flashing is by nature low in energy conversion efficiency, and repeatedly emitting flashes of very small quantities to send flash pulse trains causes large energy loss, which leads to smaller quantity of a main flash.

In addition, at the time of sending flash pulses in a main flashing procedure, the flash pulses are sent without interruption as described above because of the restriction on the number of flash pulses, which causes some difficulties in the signal transmission using flash pulses.

SUMMARY OF THE INVENTION

The present invention has been made in view of the above circumstances in the art. An object of the invention is therefore to provide a photographing system which enables flash photographing without causing a malfunction due to interference even when many photographers concurrently perform flash photographing at positions close to one another in cases such as news reporting, and which can increase the quantity of a main flash.

Another object of the invention is to provide a photographic information transmission system which enables first and second hand-held terminals to identify the photographic group they belong to without causing a malfunction due to interference.

In the photographing system of the invention in which a flash device is controlled by a signal that is transmitted from a camera to the flash device through a radio communication, a unique identification code for identification of the camera or the flash device is provided in at least one of the camera and the flash device; and the flash device comprises a collating section for collating a unique identification code that is transmitted from the camera by using radio waves as a medium, with a unique identification code originally provided in the flash device.

In this photographing system, the camera that constitutes the photographing system transmits the unique identification code of at least one of the camera and the flash device to the flash device by using radio waves as a medium. In the flash device, the collating section collates the unique identification code that is transmitted from the camera by using radio waves as a medium, with the unique identification code originally provided in the flash device.

There are three collation modes (A), (B), and (C) as follows:

(A) A case that unique identification codes are provided in the camera and the flash device, respectively:

In the flash device, the collating section collates the unique identification codes of the camera and the flash device that are transmitted from the camera by using radio waves as a medium with the unique identification codes of the camera and the flash device originally provided in the flash device.

(B) A case that a unique identification code is provided only in the camera and the flash device is equipped with a memory:

The unique identification code of the camera is transmitted to the memory of the flash device via a connecting cord, for example, and stored in the memory of the flash device. The unique identification code of the camera is transmitted from the camera to the flash device by using radio waves as a medium. In the flash device, the collating section collates the transmitted unique identification code of the camera with the stored unique identification code of the camera.

(C) A case that the camera is equipped with a memory and a unique identification code is provided only in the flash device:

The unique identification code of the flash device is transmitted to the memory of the camera via a connecting cord, for example, and stored in the memory of the camera. The unique identification code of the flash device stored in the camera is transmitted from the camera to the flash device by using radio waves as a medium. In the flash device, the collating section collates the transmitted unique identification code of the flash device with the unique identification code of the flash device provided therein.

This photographing system provides the following advantages.

First, the unique identification code for identification of the camera or the flash device is provided in at least one of the camera and the flash device. And the flash device has the collating section for collating an identification code transmitted by a radio communication with a unique identification code originally provided therein. Therefore, even where many photographing systems are used at positions close to each other, the flash device of the invention identifies the photographing system it belongs to, which can prevents erroneous flashing or erroneous responding to control signals sent from cameras of other photographing systems.

Second, the camera communicates signals for preparation for flashing to the flash device using radio waves rather than sends such signals by wireless communications using flash pulses as in the conventional case. Therefore, it is not necessary to spend, for preparation, part of the energy to be used for flashing of the flash device.

This consequently reduce the power consumption of the flash device. In addition the flash device can emit a flash having a nominal quantity that is indicated by a guide number irrespective of whether radio communications have been performed or not, and the quantity of a main flash can increase. Further, since it is not necessary to spend part of the energy to be used for flashing of the flash device by virtue of radio communications, a limitless number of photographing systems can be provided in each of which an arbitrary camera is correlated with arbitrary flash devices.

Third, it is possible to provide a large number of photographing systems in each of which an arbitrary camera is correlated with arbitrary flash devices so that the invention can accommodate even new models to be developed in the future.

Fourth, the camera's direct communication with the flash device by radio waves eliminates the necessity of equipping the camera with the conventional master flash device using flash pulses for communication.

In the above photographing system, it is desirable that the camera and the flash device be connected to each other in advance to transmit the unique identification code provided in at least one of the camera and the flash device to the other of the camera and the flash device.

Connecting the camera and the flashing device in advance enables transmission of the unique identification code provided in at least one of the camera and the flash device to the other of the camera and the flash device. This makes it possible to provide various photographing systems in each of which an arbitrary camera is correlated with an arbitrary flash device.

Therefore, according to this photographing system, a free combination of an arbitrary camera and an arbitrary flash device is possible, instead of a fixed combination of a particular camera and a particular flash device. This photographing system is particularly convenient in adding a flash device to a specific camera.

It is desirable that the flash device be provided with a unique identification code; that the camera and the flash device be connected to each other in advance to transmit the unique identification code of the flash device from the flash device to the camera, and in controlling the flash device the camera send the unique identification code of the flash device to the flash device by using radio waves as a medium; and that the collating section collate the unique identification code of the flash device that is transmitted from the camera by using radio waves as a medium with the unique identification code of the flash device that is provided in the flash device.

In this photographing system, the flash device recognizes that the signal has been sent from the camera of the photographing system to which the flash device belongs, by the collating section collating the unique identification code of the flash device transmitted from the camera by using radio waves as a medium with the unique identification code of the flash device that is provided in the flash device.

Therefore, according to this photographing system, the flash device can recognize receipt of the signal from the camera of the photographing system to which the flash device belongs only by collating the unique identification code of the flash device that is transmitted from the camera by a radio communication with the unique identification code of the flash device that is provided in the flash device. The elimination of collation on a unique identification code of the camera provides advantages of decreasing a length of time necessary for preparation for flashing of the flash device and improving responsibility.

It is desirable that the camera of this photographing system store unique identification codes of a plurality of flash devices. This allow the camera of this photographing system to control the plurality of flash devices using their unique identification codes. Therefore, the camera can control the plurality of flash devices.

It is desirable that the photographing system comprise a plurality of flash devices, and that the unique identification code of the camera be transmitted from the camera to each of the plurality of flash devices and stored therein independently.

This allows the camera to control the plurality of flash devices independently using the unique identification code of the camera. Therefore, according to this photographing system, the camera can control the plurality of flash devices.

The invention also provides a photographic information transmission system in which a second hand-held terminal is controlled based on a signal relating to photographing that is transmitted from a first hand-held terminal to the second hand-held terminal by radio transmission, wherein a unique identification code for identification of the first hand-held terminal or the second hand-held terminal is provided in at least one of the first hand-held terminal and the second hand-held terminal; and wherein the second hand-held terminal comprises a collating section for collating a unique identification code that is transmitted from the first hand-held terminal by using radio waves as a medium with a unique identification code originally provided in the second hand-held terminal.

In this photographic information transmission system, the identification code of at least one of the first hand-held terminal and the second hand-held terminal is transmitted from the first hand-held terminal that constitutes the photographic information transmission system to the second hand-held terminal by using radio waves as a medium. In the second hand-held terminal, the collating section collates the unique identification code that is transmitted from the first hand-held terminal by using radio waves as a medium with the unique identification code originally provided in the second hand-held terminal.

There are three collation modes (A), (B), and (C), which are the same as in the above-described photographing system according to the invention and hence will not be described.

This photographic information transmission system provides the following advantages.

First, employing the radio technique using radio waves for transmitting coded data of an identifier can increase the data amount of the identifier and realize reliable transmission at a high transmission rate.

Second, the second hand-held terminal has the collating section for collating an identification code transmitted by radio waves with a unique identification code originally provided therein. Therefore, even where many photographic information transmission systems are used at positions close to each other, the second hand-held terminal identifies the photographic information transmission system it belongs to, which prevents erroneous responding to control signals sent from the first hand-held terminals of other photographic information transmission systems.

In the above photographic information transmission system, it is desirable that the first hand-held terminal and the second hand-held terminal be connected to each other in advance to transmit the unique identification code provided in at least one of the first hand-held terminal and the second hand-held terminal to the other of the first hand-held terminal and the second hand-held terminal.

In this photographic information transmission system, the unique identification code provided in at least one of the first hand-held terminal and the second hand-held terminal is transmitted to the other of the first hand-held terminal and the second hand-held terminal by connecting the first hand-held terminal and the second hand-held terminal. This makes it possible to provide various photographic information transmission systems in each of which an arbitrary first hand-held terminal is correlated with an arbitrary second hand-held terminal.

Therefore, according to this photographing information transmission system, a free combination of two arbitrary hand-held terminals is possible, instead of a fixed combination of two particular hand-held terminals. This photographing system is particularly convenient in adding a hand-held terminal.

It is desirable that the second hand-held terminal be provided with a unique identification code; that the unique identification code of the second hand-held terminal be transmitted from the second hand-held terminal to the first hand-held terminal in advance by connecting the first hand-held terminal and the second hand-held terminal, and in controlling the second hand-held terminal the first hand-held terminal send the unique identification code of the second hand-held terminal to the second hand-held terminal by using radio waves as a medium; and that the collating section collate the unique identification code of the second hand-held terminal that is transmitted from the first hand-held terminal by using radio waves as a medium with the unique identification code of the second hand-held terminal provided in the second hand-held terminal.

In this photographic information transmission system, the collating section of the second hand-held terminal collates the unique identification code of the second hand-held terminal that is transmitted from the first hand-held terminal by using radio waves as a medium with the unique identification code of the second hand-held terminal provided in the second hand-held terminal, whereby the second hand-held terminal recognizes that the signal has been sent from the first hand-held terminal of the photographic information transmission system to which the second hand-held terminal belongs.

Therefore, according to this photographic information transmission system, the second hand-held terminal can recognize arrival of the signal from the first hand-held terminal of the photographic information transmission system to which the second hand-held terminal belongs only by collating the unique identification code of the second hand-held terminal that is transmitted from the first hand-held terminal by radio waves with the unique identification code of the second hand-held terminal provided in the second hand-held terminal itself. This eliminates collation of a unique identification code of the first hand-held terminal, shortens a length of the collation time, and improves the responsibility of the second hand-held terminal accordingly.

It is desirable that the first hand-held terminal and the second hand-held terminal be connected to each other via a lead wire or contact points.

In this photographic information transmission system, the photographer temporarily connects the first hand-held terminal and the second hand-held terminal via a lead wire or contact points to register the unique identification code of the first hand-held terminal or the second hand-held terminal.

Therefore, according to this photographic information transmission system in comparison with Bluetooth in which an identifier is registered by using radio waves, it is possible to reduce possibilities of erroneous connection to an unintended device (hand-held terminal) and to register an identifier in a device to which connection should be made.

It is desirable that unique identification codes of a plurality of second hand-held terminals be transmitted from the plurality of second hand-held terminals to the first hand-held terminal and stored therein. In this photographic information transmission system, the first hand-held terminal controls the plurality of second hand-held terminals using their unique identification codes. Therefore, according to this photographic information transmission system, the first hand-held terminal can control the plurality of the second hand-held terminals.

It is desirable that the photographic information transmission system comprise a plurality of second hand-held terminals, and that the unique identification code of the first hand-held terminal be transmitted from the first hand-held terminal to each of the plurality of second hand-held terminals and stored therein independently. In this photographic information transmission system, the first hand-held terminal controls the plurality of second hand-held terminals independently using the unique identification code of the first hand-held terminal. Therefore, according to this photographic information transmission system, the first hand-held terminal can control the plurality of second hand-held terminals.

It is desirable that the first hand-held terminal be a camera and the second hand-held terminal be a flash device. In this photographic information transmission system, the second hand-held terminal being a flash device is controlled by the first hand-held terminal being a camera with radio waves. Therefore, according to this photographic information transmission system, even where many photographic information transmission systems are used at positions close to each other, the flash device of the invention identifies the photographic information transmission system it belongs to, which prevents erroneous flashing or erroneous responding to a control signals sent from cameras of other photographic information transmission systems.

The camera communicates signals for preparation for flashing to the flash device using radio waves rather than sends such signals by wireless communications using flash pulses as in the conventional case. Therefore, it is not necessary to spend, for preparation, part of the energy to be used for flashing of the flash device.

As a result, the power consumption of the flash device can be reduced and the flash device can emit a flash having a nominal quantity that is indicated by a guide number; the quantity of a main flash can increase. Further, since it is not necessary to spend part of the energy to be used for flashing of the flash device by virtue of radio communications, a limitless number of photographic information transmission systems can be provided, in each of which an arbitrary camera is correlated with arbitrary flash devices.

Further, the camera's direct control of the flash device with radio waves eliminates the necessity of equipping the camera with a conventional external flash device that uses flash pulses for signal transmission.

It is desirable that the first hand-held terminal be a camera and the second hand-held terminal be a cellular phone. In this photographic information transmission system, the second hand-held terminal being a cellular phone is controlled by the first hand-held terminal being a camera with radio waves. Therefore, according to this photographic information transmission system, photographic data can be transmitted from the camera to the cellular phone.

It is also desirable that the first hand-held terminal be a camera and the second hand-held terminal be a camera. In this photographic information transmission system, the second hand-held terminal being a camera is controlled by the first hand-held terminal being a camera with radio waves. This reduces the time and the amount of operation necessary for determining quality of flash, and also allows simultaneous operations of a plurality of cameras. Accordingly, in this photographic information transmission system, the first hand-held terminal can control a plurality of second hand-held terminals.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 13 shows the details of a camera-side memory and flash-device-side memories of a photographing system according to a third embodiment of the invention;

DESCRIPTION OF THE PREFERRED EMBODIMENTS

Embodiments of the present invention will be hereinafter described with reference to the accompanying drawings.

Embodiment 1

FIGS. 1–7 show a photographing system and a photographic information transmission system according to a first embodiment of the invention. In this embodiment, the first hand-held terminal is a camera and the second hand-held terminals are flash devices. The photographing system is an example of the photographic information transmission system.

Figure 1:
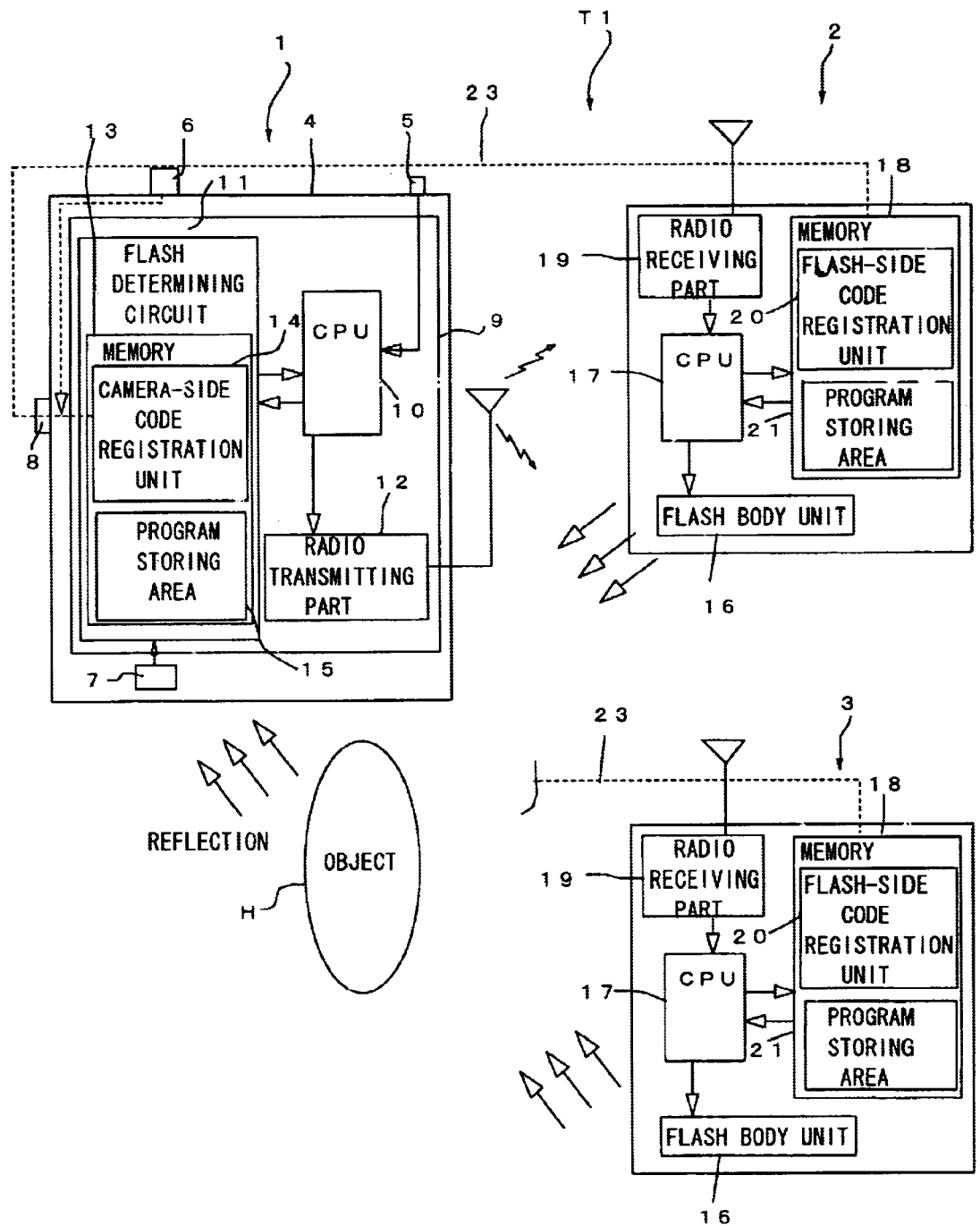
FIG. 1 is a block diagram showing the configuration of a first photographing system according to a first embodiment of the present invention.

As shown in FIG. 1, a first photographing system T1 is composed of a single camera and devices that are a plurality of (two in this embodiment) slaves as accessories of the camera.

The camera 1 is equipped, as accessories, with the first flash device 2 and the second flash device 3 that emit flashes to an object H to be photographed by the camera 1. In the first following, the first flash devices 2 and the second flash device 3 are referred to as the first and second flash devices 2 and 3. The first and second flash devices 2 and 3 are provided separately from the camera 1.

The camera 1 has a function of receiving light reflected by the object H with a light-receiving element 7 and controlling the quantities of flashes to be emitted by the first and second flash devices 2 and 3 based on quantities of received light.

The camera 1 has a camera body unit 4 for photographing the object H. The camera body unit 4 is equipped with a shutter button 5, a flash device setting button 6, the light-receiving element 7, and a hot shoe 8, and is not equipped with a device corresponding to the conventional master flash device.

The camera body unit 4 is also equipped with a control circuit 9, which is composed of a CPU 10, a flash determining circuit 11, and a radio transmitting part 12. The flash determining circuit 11 is composed of a known circuit having a flash quality determining function and a memory 13. The memory 13 has a camera-side code registration unit 14 and a program storing area 15.

The camera-side code registration unit 14 is connected temporarily to a flash device setting button 6, temporarily to a flash-side code registration unit 20 described later via a lead wire, that is, a connecting cord 23 (indicated by a broken line FIG. 1).

Figure 7:
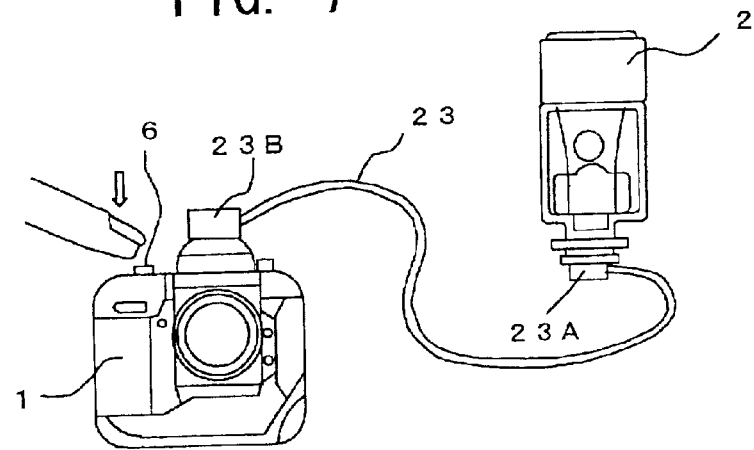
FIG. 7 shows a setup for registering unique identification codes.

Temporary connection between the first flash device 2 and the hot shoe 8 of the camera 1 can be established directly by the photographer's setting the first flash device 2 on the hot shoe 8 of the camera 1 and thereby bringing the first flash device 2 and the camera 1 into direct contact with each other via their contact points 23A and 23B (shown in FIG. 7). This dispenses with the connecting cord 23 and simplifies establishment of temporary connection.

An identification code (identifier) unique to the camera 1 and identification codes (identifiers) unique to the first and second flash devices 2 and 3, respectively, are stored in the camera-side code registration unit 14 (in a state that preparatory operations shown in FIGS. 4(A) and 4(B) (described later) have completed; see FIG. 2).

Figure 2:
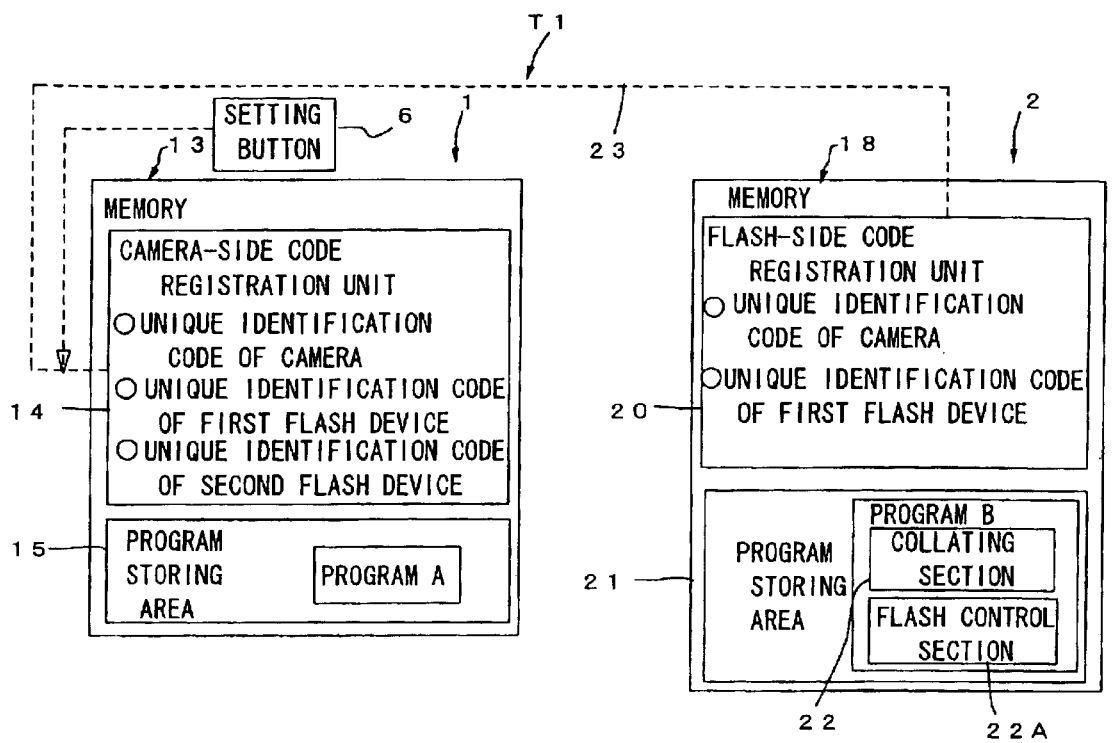
FIG. 2 shows the details of a camera-side memory and a flash-device-side memory shown in FIG. 1.

The program storing area 15 contains a program A indicating radio transmission procedures of preliminary flashing and main flashing (see FIG. 2).

In preliminary flashing and main flashing, the radio transmitting part 12 sends, to the first and second flash devices 2 and 3, radio signals (electrical signals) carrying the unique identification code of the camera 1, the unique identification codes of the first and second flash devices 2 and 3, and data of a pre-flash command or a main flash command.

The first flash device 2 has a flash body unit 16 for emitting a flash, a CPU 17, a memory 18, and a radio receiving part 19. The memory 18 has a flash-side code registration unit 20 and a program storing area 21.

The unique identification codes of the first flash device 2 and the camera 1 are stored in the flash-side code registration unit 20 (in a state that preparatory operations shown in FIGS. 4(A) and 4(B) (described later) have completed). The flash-side code registration unit 20 is connected temporarily to the hot shoe 8 of the camera 1 via the connecting cord 23 (indicated by a broken line in FIG. 1) or the contact points 23A and 23B (shown in FIG. 7).

The program storing area 21 contains a program B indicating radio reception procedures of preliminary flashing and main flashing. The program B also indicates procedures of a collating section 22 and a flash control section 22A. The collating section 22 collates the unique identification codes of the camera 1 and the first flash device 2 stored in the flash-side code registration unit 20 with identification codes sent from the camera 1 by radio waves (a transmission medium). The flash control section 22A controls flashing in response to a coincidence output of the collating section 22.

The second flash device 3 is basically the same in configuration as the first flash device 2, and is different from the first flash device 2 in that the unique identification codes of the camera 1 and the second flash device 3 are stored in the flash-side code registration unit 20 of the second flash device 3.

The unique identification codes of the camera 1 and the first and second flash devices 2 and 3 of the first photographing system T1 should be compatible with those of other cameras and other flash devices including ones to be manufactured in the future so as not to cause radio interference when the first photographing system T1 is used together with another photographing system. To this end, the above identification codes are given a sufficiently large number of digits and a coding system that can provide different identification codes for all products of all models including ones to be manufactured in the future. An example of the identification codes unique to the camera 1 and the first and second flash devices 2 and 3 is a combination of a type of camera 1 and its production number or a symbol representing it (e.g., a combination of a character string and a numeral string). Another example is a code obtained by combining a model code and a production number of each of the camera 1 and the first and second flash devices 2 and 3. This is the same as assigning numbers like a telephone number to the camera 1 and the first and second flash devices 2 and 3.

A particular lens may be attached to the camera body unit 4, or a converter lens may be attached to the front unit of the lens-barrel of the camera 1. However, the particular lens and the converter lens do not have a electric contact point to be connected to the camera body unit 4. A configuration is possible in which a radio transmitting part is provided in the particular lens or the converter lens and information to the effect that the particular lens or the converter lens is attached to the camera body unit 4 or unique information such as the focal length of the particular lens or the converter lens is sent to the camera body unit 4. In this case, the radio transmitting part functions as an electric contact point.

Next, the operation of this embodiment will be described.

In the first photographing system T1, flash photographing is performed in the following manner in order of (1) preparatory operations, (2) preliminary flashing, and (3) main flashing.

(1) Preparatory Operations

The preparatory operations of the first photographing system T1 will be described below with reference to FIG. 4 and FIG. 7.

As shown in FIG. 4(A), the unique identification code of the camera 1 is stored in the camera-side code registration unit 14 of the memory 13 of the camera 1. The unique identification codes of the respective flash devices 2 and 3 are stored in the flash-side code registration units 20 of the memories 18 of the respective flash devices 2 and 3.

As shown in FIGS. 4(B) and 7, the camera 1 and the first flash device 2 are connected to each other temporarily via the connecting cord 23 or the contact points 23A and 23B. In this state, the setting button 6 of the camera 1 is depressed, whereupon bidirectional communications are performed between the camera 1 and the first flash device 2 via the connecting cord 23 or the contact points 23A and 23B. As a result, the unique identification code of the first flash device 2 is stored in the camera-side code registration unit 14 of the camera 1 where the unique identification code of the camera 1 is already stored, and the unique identification code of the camera 1 is stored in the flash-side code registration unit 20 of the first flash device 2 where the unique identification code of the first flash device 2 is already stored.

Similarly, bidirectional communications are performed between the camera 1 and the second flash device 3 via the connecting cord 23 or the contact points 23A and 23B. As a result, the unique identification code of the second flash device 3 is stored in the camera-side code registration unit 14 of the camera 1 where the unique identification code of the camera 1 is already stored, and the unique identification code of the camera 1 is stored in the flash-side code registration unit 20 of the second flash device 3 where the unique-identification code of the second flash device 3 is already stored. FIG. 4(B) shows this state.

In the conventional example, an identifying signal is produced by setting presence or absence of each flash pulse and hence the setup takes time and labor. In contrast, in this embodiment, merely depressing the setting button 6 of the camera 1 initiates a bidirectional communication in which the unique identification codes of the camera 1 and the first flash device 2 are communicated to each other via the connecting cord 23 or the contact points 23A and 23B; the setup does not take long time or much labor.

After the above preparatory operations, the first photographing system T1 performs flash photographing.

Flash photographing starts when the photographer depresses the shutter button 5. After radio communications are performed in a manner shown in FIGS. 3, 4(C), and 5 or 6, the first and second flash devices 2 and 3 emit flashes (preliminary flashes or main flashes). FIG. 4(c) shows a state that the camera 1 is sending control signals for preliminary flashing or main flashing to the first and second flash devices 2 and 3.

The preliminary flashing and the main flashing will be described below with reference to FIGS. 1 to 6.

(2) Preliminary Flashing

First, a process that is executed in the camera 1 will be described.

Figure 5:
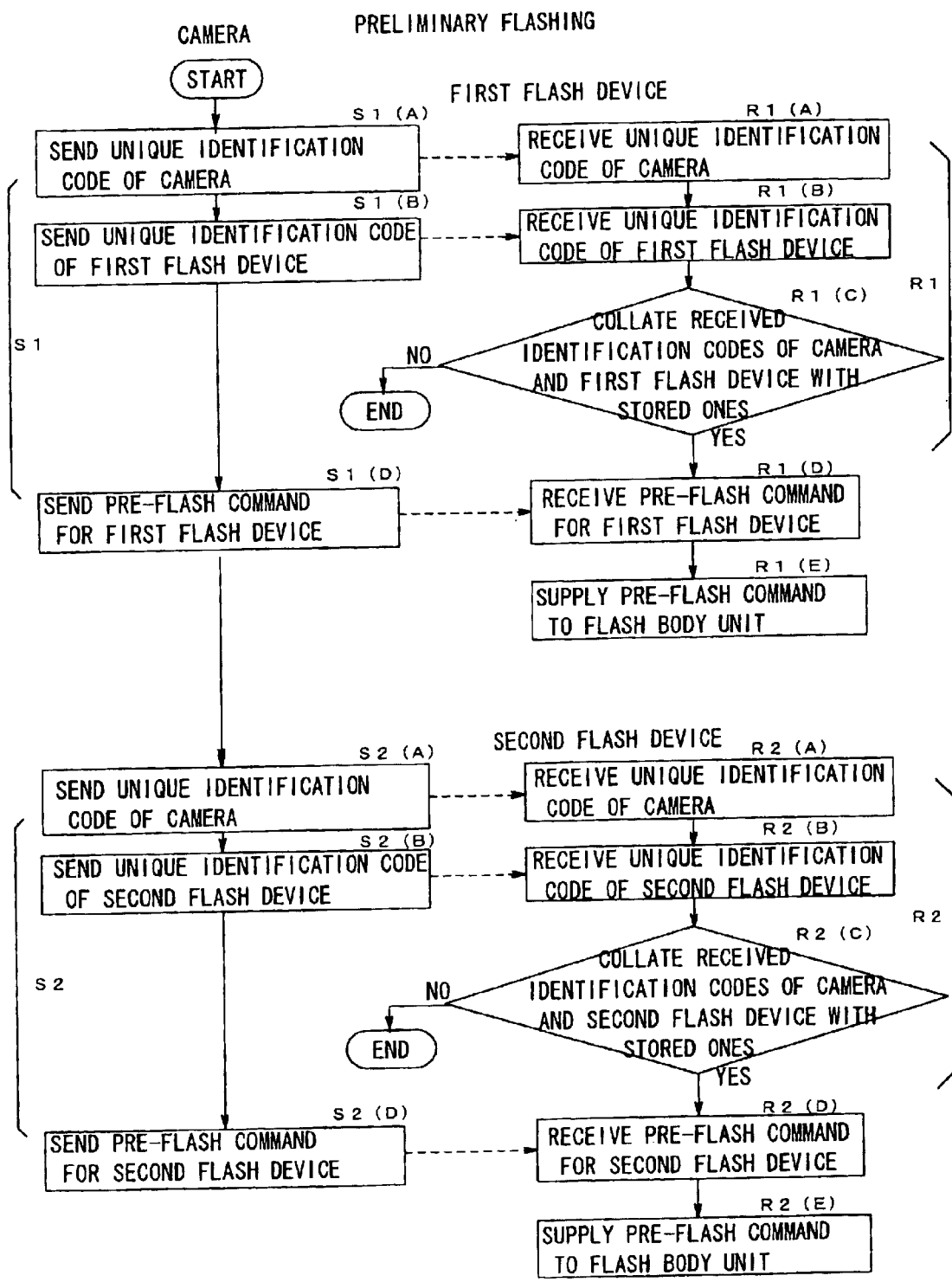
FIG. 5 is a flowchart showing a preliminary flashing process according to the first embodiment.

In the first photographing system T1, control signals are sent from the radio transmitting part 12 of the camera 1 to the radio receiving part 19 of the first flash device 2 by radio waves (a transmission medium) (step S1 in FIG. 5). Step S1 in FIG. 5 consists of substeps S1(A), S1(B), and S1(D) that are executed in this order. That is, control signals of the unique identification code of the camera 1 (S1(A)), the unique identification code of the first flash device 2 (S1(B)), and a flash command for the first flash device 2 (S1(D)) are sent in this order.

Then, control signals are sent from the radio transmitting part 12 of the camera 1 to the radio receiving part 19 of the second flash device 3 by radio waves (step S2 in FIG. 5). Step S2 in FIG. 5 consists of substeps S2(A), S2(B), and S2(D) that are executed in this order. That is, control signals of the unique identification code of the camera 1 (S2(A)), the unique identification code of the second flash device 3 (S2(B)), and a flash command for the second flash device 3 (S1(D)) are sent in this order.

Next, processes that are executed in the first and second flash devices 2 and 3 will be described.

Since the first and second flash devices 2 and 3 have basically the same configuration, only step R1 that is executed in the first flash device 2 will be described below. Step R2 shown in FIG. 5 that is executed in the second flash device 3 will not be described below.

The radio receiving part 19 of the first flash device 2 receives the unique identification codes of the camera 1 and the first flash device 2 and other information (step R1 in FIG. 5).

Step R1 consists of substeps R1(A), R1(B), R1(C), R1(D), and R1(E) that are executed in this order. At substep R1(A), the first flash device 2 receives the unique identification code of the camera 1. At substep R1(B), the first flash device 2 receives the unique identification code of the first flash device 2 itself.

At substep R1(C), the collating section 22 collates the identification codes received from the camera 1 with the unique identification codes of the camera 1 and the first flash device 2 that are stored in the first flash device 2. If the received identification codes coincide with the stored unique identification codes, respectively, the process goes to substep R1(D). That is, the flash control section 22A controls flashing (i.e., passes a flash command to the flash body unit 16) in response to a coincidence output from the collating section 22.

As a result, the first flash device 2 recognizes that it corresponds to the camera 1 of the first photographing system T1. This makes it possible to prevent radio interference because the first flash device 2 does not respond to a signal sent from the camera of another photographing system.

At substep R1(E), the radio receiving part 19 outputs a pre-flash command to the flash body unit 16.

The camera 1 confirms that the codes and the command have been received by the first flash device 2 at substeps R1(A), R1(B), and R1(D) by the light-receiving element 7's detecting a preliminary flash of the first flash device 2; the first flash device 2 does not send, to the camera 1, any replies to the effect that the code or command has been received.

Receiving the pre-flash command, the flash body unit 16 emits a preliminary flash to the object H.

As described above, as shown in FIG. 3, the first flash device 2 emits the preliminary flash in response to the control signal that is sent from the camera 1 to the first flash device 2. Subsequently, the second flash device 3 emits a preliminary flash in response to a control signal that is sent from the camera 1 to the second flash device 3.

Reflected light produced by the object H's reflecting the preliminary flashes passes through the photographic lens (not shown) of the camera body unit 4 and is detected by the light-receiving element 7. The flash photographing then makes a transition to the main flashing.

(3) Main Flashing

First, a process that is executed in the camera 1 will be described.

Figure 6:
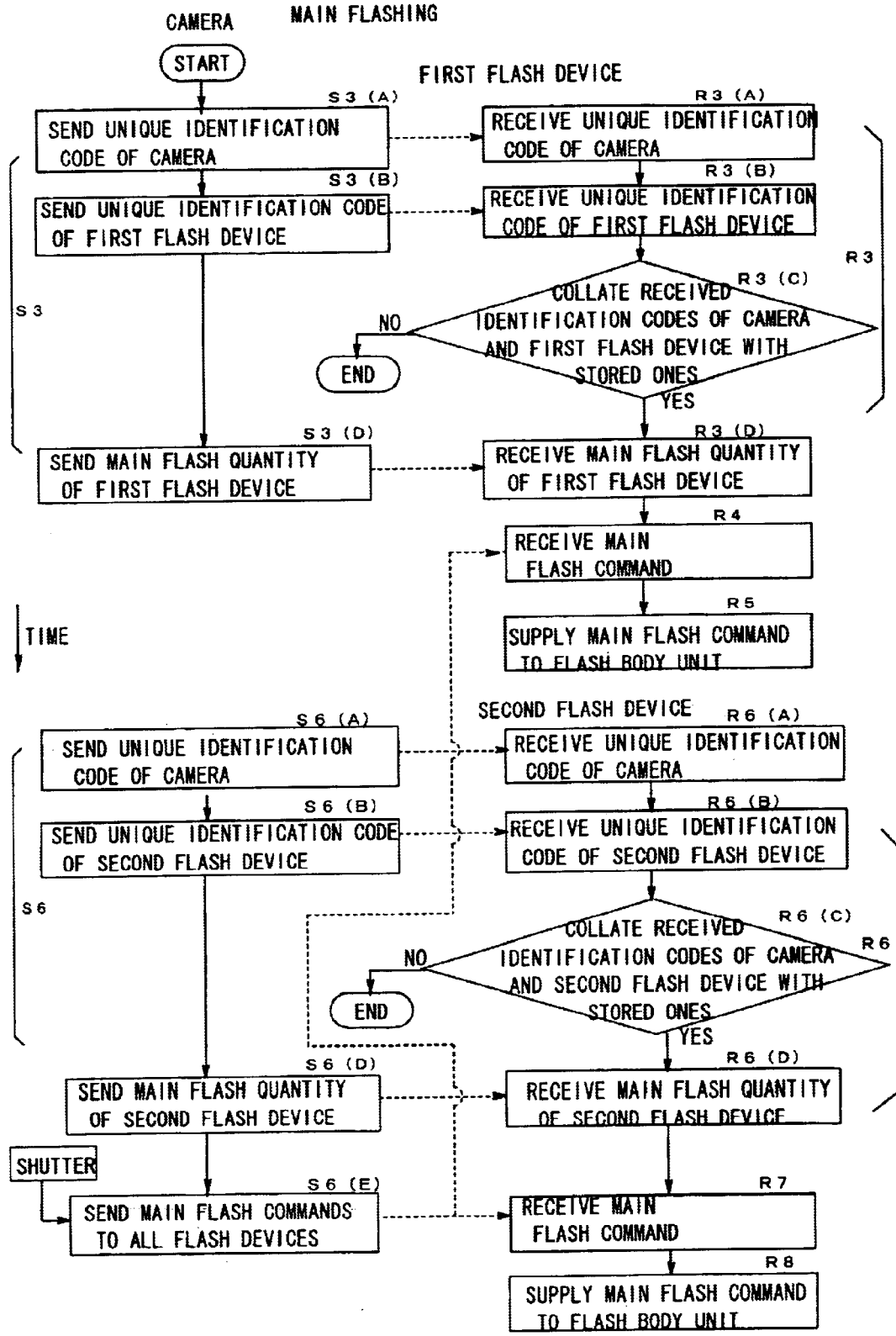
FIG. 6 is a flowchart showing a main flashing process according to the first embodiment.

As shown in FIG. 6, control signals are sent from the radio transmitting part 12 of the camera 1 to the radio receiving part 19 of the first flash device 2 by radio waves (a transmission medium) (step S3 in FIG. 6). Step S3 in FIG. 6 consists of substeps S3(A), S3(B), and S3(D) that are executed in this order. That is, control signals of the unique identification code of the camera 1 (S3(A)), the unique identification code of the first flash device 2 (S3(B)), and a main flash quantity of the first flash device 2 (S3(D)) are sent in this order.

The main flash quantity that is sent at substep S3(D) is a quantity that has been calculated by the flash determining circuit 11 based on a quantity of reflected light detected by the light-receiving element 7.

Then, control signals are sent from the radio transmitting part 12 of the camera 1 to the radio receiving part 19 of the second flash device 3 by radio waves (a transmission medium) (step S6 in FIG. 6). Step S6 in FIG. 6 consists of substeps 56(A), S6(B), and S6(D) that are executed in this order. That is, control signals of the unique identification code of the camera 1 (S6(A)), the unique identification code of the second flash device 3 (S6(B)), and a main flash quantity of the second flash device 3 (S6(D)) are sent in this order.

Figure 3:
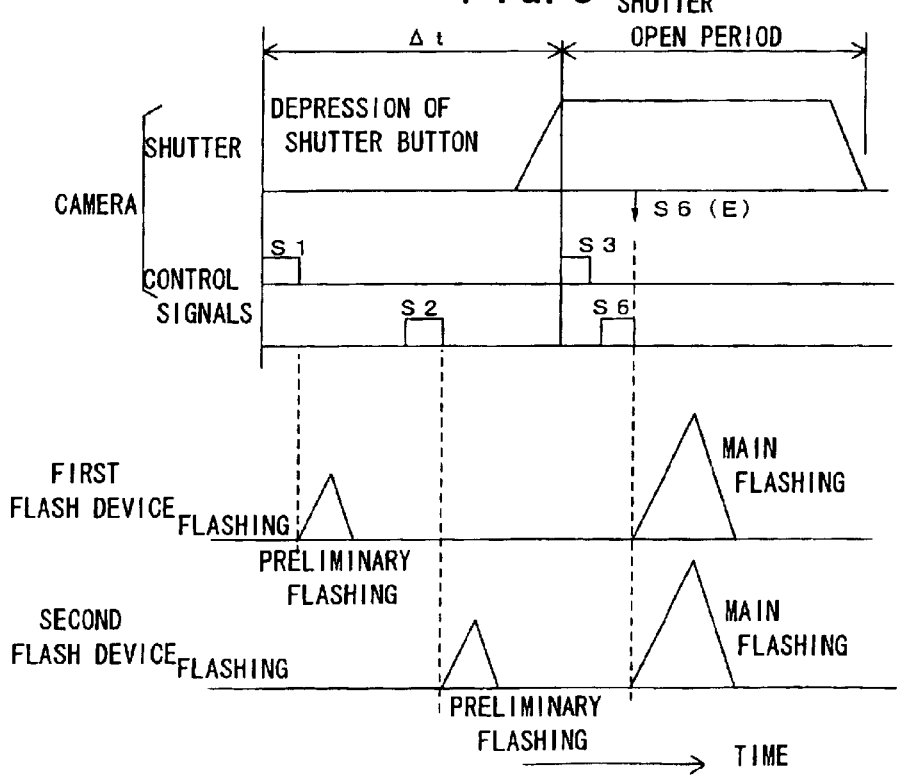
FIG. 3 is a timing chart showing how a camera and flash devices operate.

As shown in FIG. 3, after a lapse of a time At from the depression of the shutter button 5, main flash commands are sent simultaneously from the radio transmitting part 12 of the camera 1 to the radio receiving parts 19 of the first and second flash devices 2 and 3 approximately in synchronism with the start of an open period of the shutter (not shown) (substep S6(E)).

Next, processes that are executed in the first and second flash devices 2 and 3 will be described.

First, the radio receiving part 19 of the first flash device 2 receives the unique identification codes of the camera 1 and the first flash device 2 and other information (step R3 in FIG. 6).

Step R3 in FIG. 6 consists of substeps R3(A), R3(B), R3(C), and R3(D) that are executed in this order. At substep R3(A), the first flash device 2 receives the unique identification code of the camera 1. At substep R3(B), the first flash device 2 receives the unique identification code of the first flash device 2 itself.

At substep R3(C), in the first flash device 2, the collating section 22 collates the identification codes received from the camera 1 with the unique identification codes of the camera 1 and the first flash device 2 that are stored in the first flash device 2. If the received identification codes coincide with the stored unique identification codes, respectively, the process goes to substep R3(D). That is, the flash control section 22A controls flashing (i.e., passes a flash command to the flash body unit 16) in response to a coincidence output from the collating section 22.

As a result, the first flash device 2 recognizes that it corresponds to the camera 1 of the first photographing system T1. This makes it possible to prevent radio interference because the first flash device 2 does not respond to a signal sent from the camera of another photographing system.

The camera 1 confirms that the codes and the commands have been received by the first flash device 2 at substeps R3(A), R3(B), and R3(D) and step R4 by the first flash device 2's emitting a main flash; the first flash device 2 does not send, to the camera 1, any replies to the effect that the code or command has been received.

On the other hand, the second flash device 3 executes step R6 in FIG. 6. Step R6 in FIG. 6 consists of substeps R6(A), R6(B), R6(C), and R6(D) that are executed in this order. Since the first and second flash devices 2 and 3 have basically the same configuration, the process that is executed in the second flash device 3 will not be described any further.

Then, main flash commands are sent simultaneously from the radio transmitting part 12 of the camera 1 to the radio receiving parts 19 of the first and second flash devices 2 and 3 (substep S6(E) in FIG. 6) and the radio receiving parts 19 of the first and second flash devices 2 and 3 receive the main flash commands simultaneously (steps R4 and R7). The main flash commands are output from the radio receiving parts 19 to the flash body units 16 via the CPUs 17, respectively (steps R5 and R8). The flash body units 16 emit main flashes to the object H.

After the first and second flash devices 2 and 3 stop emitting the main flashes, the shutter of the camera 1 is closed. The flash photographing is thus completed.

The above configuration provides the following advantages.

First, the unique identification codes of the camera 1 and the first and second flash devices 2 and 3 are stored in the camera 1 and each of the first and second flash devices 2 and 3. And each of the first and second flash devices 2 and 3 has the collating section 22 for collating identification codes that are transmitted by a communication using radio waves with the stored unique identification codes. Therefore, even where many photographing systems are set close to each other, the first and second flash devices 2 and 3 recognize the first photographing system T1 to which they belong to and hence are prevented from erroneously responding to a control signal sent from the camera of a photographing system other than the photographing system T1 or from lashing erroneously.

Second, the camera 1 communicates signals for preparation for flashing to the first and second flash devices 2 and 3 using radio waves rather than sends such signals by wireless communications using flash pulses as in the conventional case. Therefore, it is not necessary to spend, for preparation, part of the energy to be used for flashing of the first and second flash devices 2 and 3.

As a result, the power consumption can be reduced and the first and second flash devices 2 and 3 can emit flashes having nominal quantities that are indicated by guide numbers irrespective of whether radio communications have been performed or not; the quantities of main flashes increase. Further, since it is not necessary to spend part of the energy to be used for flashing of the first and second flash devices 2 and 3 by virtue of communications using radio waves, a limitless number of photographing systems can be provided in each of which an arbitrary camera is correlated with arbitrary flash devices.

Third, by making it possible to provide a large number of photographing systems in each of which an arbitrary camera is correlated with arbitrary flash devices, the invention can accommodate even new models to be developed in the future.

Fourth, since the camera 1 directly communicates with the first and second flash devices 2 and 3 by radio waves, it is no longer necessary to equip the camera 1 with the conventional master flash device 101 for communication using flash pulses.

Fifthly, in flash photographing, since the camera 1 communicates with the first and second flash devices 2 and 3 by radio waves, the communications are not influenced by their postures or the environment brightness. For example, communications using radio waves can still be performed even if shielding plates may be interposed in between.

Sixthly, the first photographing system T1 employing a radio technology using radio waves for transmission of data obtained by coding identification codes increases the number of data relating to identification codes and the transmission rate, and achieves good data transmission.

Seventhly, the camera 1 sends signals to the first and second flash devices 2 and 3 over a unidirectional transmission channel. Therefore, the only equipment to be provided to use this radio technology is the radio transmission part 12 that is provided in the camera 1 and the radio receiving parts 19 that are provided in the first and second flash devices 2 and 3, respectively.

Eighthly, necessary identification codes are registered by the photographer's connecting the camera 1 to each of the first and second flash devices 2 and 3 in advance by the lead wire 23 or the contact points 23A and 23B, and radio waves are used in using the first photographing system T1. This reliably eliminates a possibility (e.g., an example described below) that the camera 1 is erroneously connected to an unintended device (the first flash device 2 or the second flash device 3) unlike the case of using Bluetooth in which identification codes are registered by using radio waves. The photographer can have identification codes registered in intended devices accurately.

A description will be made of how the photographer erroneously connects the camera 1 to an unintended device in connecting the camera 1 to the first and second flash devices 1 and 2 in advance by using radio waves.

Assume that the camera 1 sends radio waves for registration of identification codes within the range of the first photographing system T1. In this case, the following connection problems may occur. The photographer may erroneously judge that an unintended device is an intended one; that is, because of carelessness of the photographer, radio waves may be sent to a device (flash device) to which connection should not be made. Assume another case that a plurality of photographing systems are set close to each other and radio waves are sent from the camera 1 to the first flash device 2 or the second flash device 3 for registration of the identification code. In this case, a transmission channel may be formed not only between the camera 1 and each of the first and second flash devices 2 and 3 of the first photographing system T1 to which the camera 1 belongs but also between the camera 1 and a flash device of a second photographing system to which the camera 1 does not belong to. As a result, there is a possibility that the camera 1 sends data of the identification code to the flash device of the second photographic system and is erroneously connected to the unintended device.

Embodiment 2

FIGS. 9–12 show a photographing system and a photographic information transmission system according to a second embodiment of the invention. In this embodiment, the first hand-held terminal is a camera and the second hand-held terminals are flash devices. The photographing system is an example of the photographic information transmission system.

A second photographing system T2 is composed of a single camera 1 and first and second flash devices 2 and 3 that are a plurality of (two in this embodiment) slaves as accessories of the camera 1.

The second photographing system T2 is basically the same in configuration as the first photographing system T1 according to the first embodiment. Only the differences will be described below.

Figure 9:
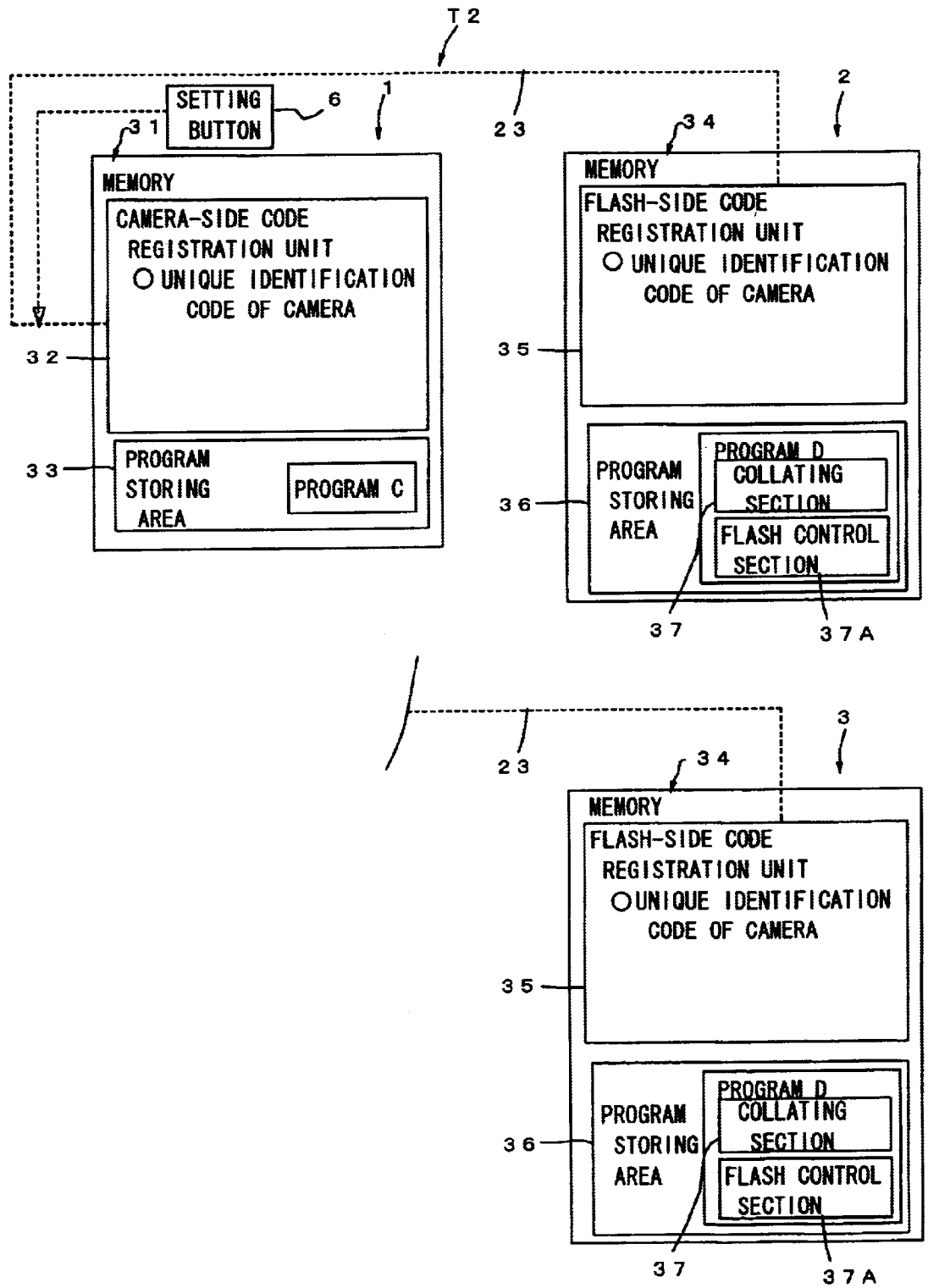
FIG. 9 shows the details of a camera-side memory and flash-device-side memories of a photographing system according to a second embodiment of the invention.

As shown in FIG. 9, a memory 31 of the camera 1 has a camera-side code registration unit 32 and a program storing area 33. An identification code (identifier) that is unique to the camera 1 is stored in the camera-side code registration unit 32. The program storing area 33 contains a program C indicating radio transmission procedures of preliminary flashing and main flashing.

The memory 34 of the first flash device 2 has a flash-side code registration unit 35 and a program storing area 36.

The identification code (identifier) that is unique to the camera 1 is stored in the flash-side code registration unit 35 (in a state that preparatory operations shown in FIGS. 10(A) and 10(B) (described later) have completed). The flash-side code registration unit 35 is connected temporarily to the camera-side code registration unit 32 of the camera 1 via the connecting cord 23 (see FIG. 7) or the contact points 23A and 23B.

The program storing area 36 contains a program D indicating radio reception procedures of preliminary flashing and main flashing. The program D also indicates procedures of a collating section 37 and a flash control section 37A. The collating section 37 collates the unique identification code of the camera 1 stored in the flash-side code registration unit 35 with an identification code sent from the camera 1 by radio waves (a transmission medium). The flash control section 37A controls flashing in response to a coincidence output of the collating section 22.

The second flash device 3 is the same in configuration as the first flash device 2, and hence will not be described.

Next, the operation of this embodiment will be described.

In the second photographing system T2, flash photographing is performed in the following manner in order of (1) preparatory operations, (2) preliminary flashing, and (3) main flashing.

(1) Preparatory Operations

Figure 10:
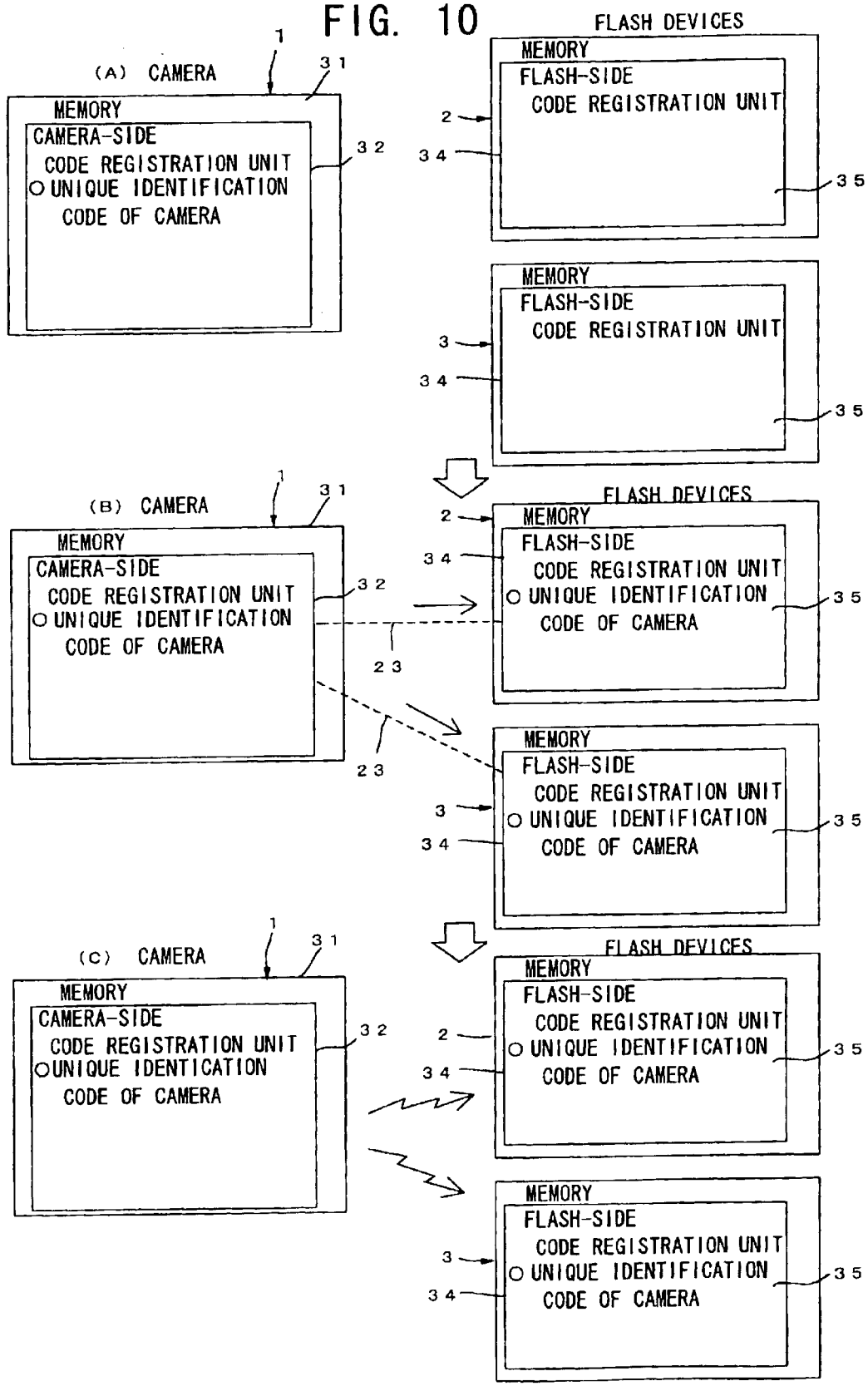
FIG. 10 illustrates how a unique identification code is communicated to and stored in the camera-side memory and the flash-device-side memories shown in FIG. 9.

The preparatory operations of the second photographing system T2 will be described below with reference to FIG. 7 and FIG. 10.

As shown in FIG. 10(A), the unique identification code of the camera 1 is stored in the camera-side code registration unit 32 of the memory 31 of the camera 1. No data are stored in the flash-side code registration units 35 of the memories 34 of the flash devices 2 and 3, respectively.

As shown in FIGS. 7 and 10(B), the camera 1 and the first flash device 2 are connected to each other temporarily via the connecting cord 23 or the contact points 23A and 23B. In this state, the setting button 6 of the camera 1 is depressed, whereupon a communication is performed between the camera 1 and the first flash device 2 via the connecting cord 23 or the contact points 23A and 23B. As a result, the unique identification code of the camera 1 is sent from the camera 1 to the first flash device 2 as indicated by an arrow in FIG. 10(B) and stored in the flash-side code registration unit 35 of the first flash device 2.

Similarly, the unique identification code of the camera 1 is stored in the flash-side code registration unit 35 of the second flash device 3. FIG. 10(B) shows this state.

After the above preparatory operations, the second photographing system T2 performs flash photographing.

Flash photographing starts when the photographer depresses the shutter button 5. After radio communications are performed in a manner shown in FIGS. 3, 10(C), and 11 or 12, the first and second flash devices 2 and 3 emit flashes (preliminary flashes or main flashes). FIG. 10(C) shows a state that the camera 1 is sending control signals for preliminary flashing or main flashing to the first and second flash devices 2 and 3.

The preliminary flashing and the main flashing will be described below with reference to FIGS. 3 and 9–12.

(2) Preliminary Flashing

First, a process that is executed in the camera 1 will be described.

Figure 11:
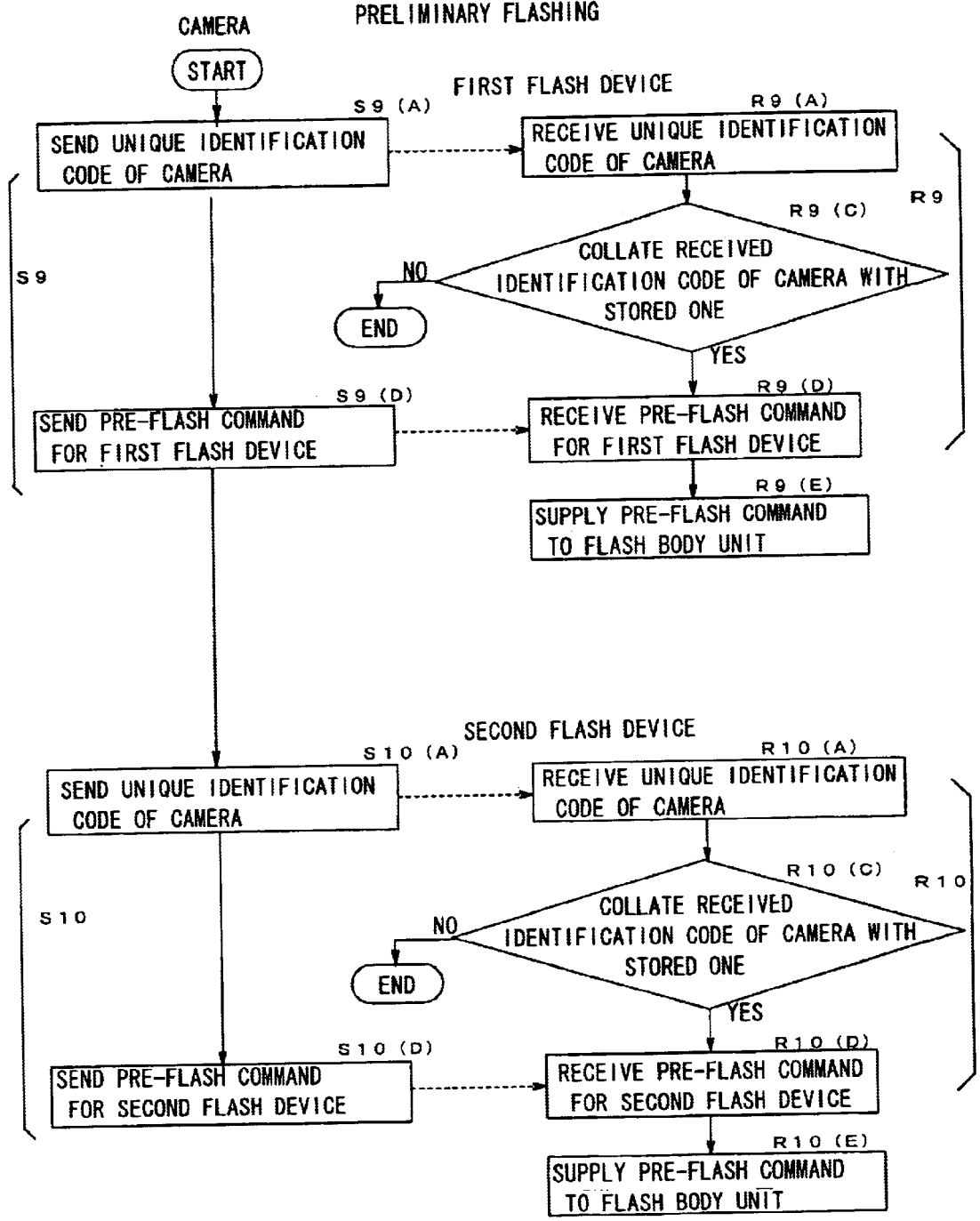
FIG. 11 is a flowchart showing a preliminary flashing process according to the second embodiment.

In the second photographing system T2, control signals are sent from the radio transmitting part 12 of the camera 1 to the radio receiving part 19 of the first flash device 2 by radio waves (a transmission medium) (step S9 in FIG. 11). Step S9 in FIG. 11 consists of substeps S9(A) and S9(D) that are executed in this order. That is, control signals of the unique identification code of the camera 1 (S9(A)) and a flash command for the first flash device 2 (S9(D)) are sent in this order.

Then, control signals are sent from the radio transmitting part 12 of the camera 1 to the radio receiving part 19 of the second flash device 3 by radio waves (a transmission medium) (step S10 in FIG. 11). Step S10 in FIG. 11 consists of substeps S10(A) and S10(D) that are executed in this order.

Next, processes that are executed in the first and second flash devices 2 and 3 will be described.

Since the first and second flash devices 2 and 3 have the same configuration, only step R9 that is executed in the first flash device 2 will be described below. Step R10 shown in FIG. 11 that is executed in the second flash device 3 will not be described below.

The radio receiving part 19 of the first flash device 2 receives the unique identification codes of the camera 1 (step R9 in FIG. 11).

Step R9 consists of substeps R9(A), R9(C), R9(D), and R9(E) that are executed in this order. At substep R9(A), the first flash device 2 receives the unique identification code of the camera 1.

At substep R9(C), the collating section 37 collates the identification code received from the camera 1 with the unique identification code of the camera 1 that is stored in the first flash device 2. If the received identification code coincides with the stored unique identification code, the process goes to substep R9(D). That is, the flash control section 37A controls flashing (i.e., passes a flash command to the flash body unit 16) in response to a coincidence output from the collating section 37.

As a result, the first flash device 2 recognizes that it corresponds to the camera 1 of the second photographing system T2. This makes it possible to prevent radio interference because the first flash device 2 does not respond to a signal sent from the camera of another photographing system.

At substep R9(E), the radio receiving part 19 outputs a pre-flash command to the flash body unit 16.

The camera 1 confirms that the code and the command have been received by the first flash device 2 at substeps R9(A) and R9(D) by the light-receiving element 7's detecting a preliminary flash of the first flash device 2; the first flash device 2 does not send, to the camera 1, any replies to the effect that the code or command has been received.

The emission of preliminary flashes and the operations performed thereafter are the same as in the first photographing system T1 according to the first embodiment, and hence will not be described.

The flash photographing then makes a transition to the main flashing.

(3) Main Flashing

First, a process that is executed in the camera 1 will be described.

Figure 12:
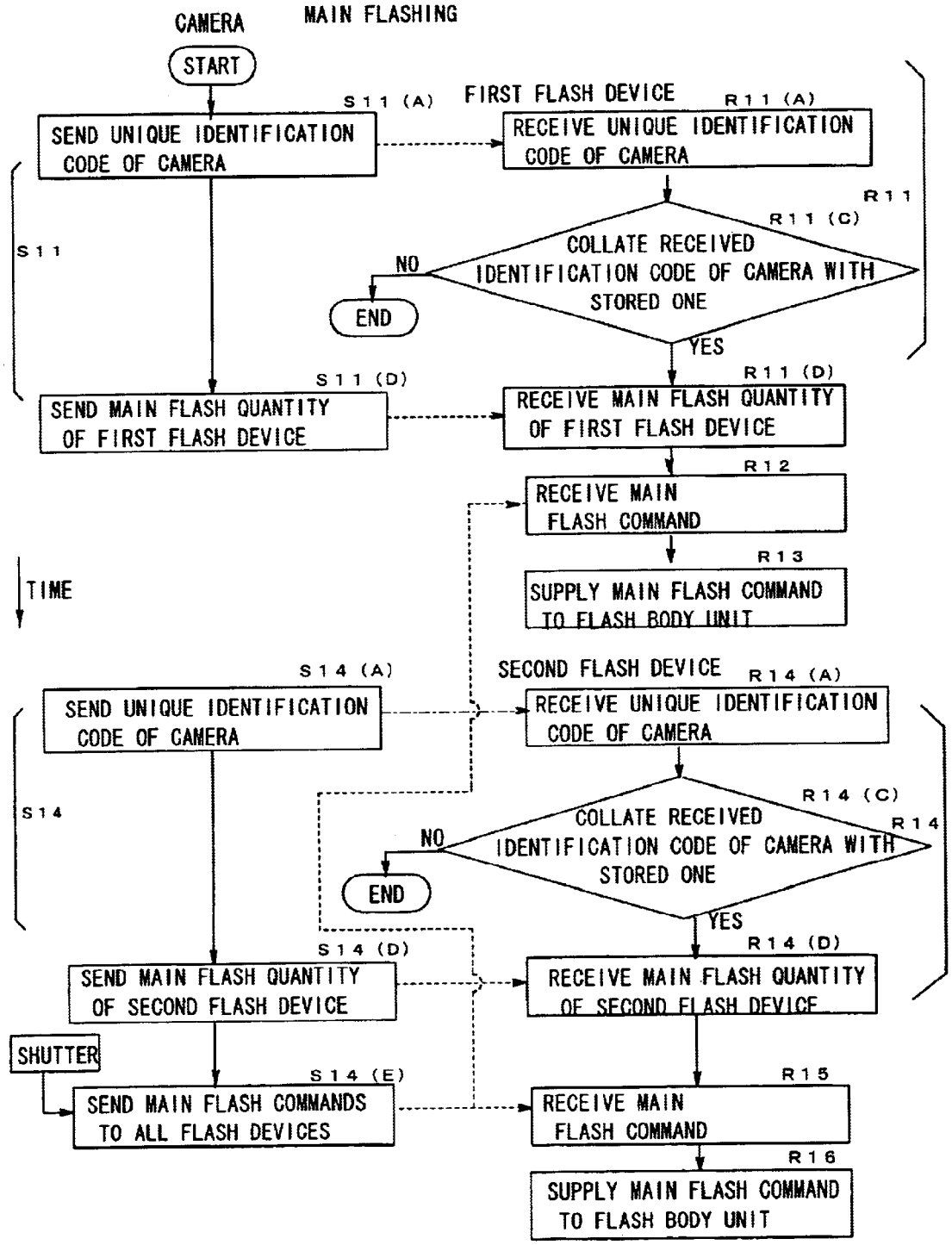
FIG. 12 is a flowchart showing a main flashing process according to the second 5 embodiment.

As shown in FIG. 12, control signals are sent from the radio transmitting part 12 of the camera 1 to the radio receiving part 19 of the first flash device 2 by radio waves (a transmission medium) (step S11 in FIG. 12). Step S11 in FIG. 12 consists of substeps S11 (A) and S11 (D) that are executed in this order. That is, control signals of the unique identification code of the camera 1 (S11(A)) and a main flash quantity of the first flash device 2 (S11(D)) are sent in this order.

The main flash quantity that is sent at substep S11(D) is a quantity that has been calculated by the flash determining circuit 11 based on a quantity of reflected light detected by the light-receiving element 7.

Then, control signals are sent from the radio transmitting part 12 of the camera 1 to the radio receiving part 19 of the second flash device 3 by radio waves (a transmission medium) (step S14 in FIG. 12). Step S14 in FIG. 12 consists of substeps S14(A) and S14(D) that are executed in this order. That is, control signals of the unique identification code of the camera 1 (S14(A)) and a main flash quantity of the second flash device 3 (S14(D)) are sent in this order.

As shown in FIG. 3, after a lapse of a time At from the depression of the shutter button 5, main flash commands are sent simultaneously from the radio transmitting part 12 of the camera 1 to the radio receiving parts 19 of the first and second flash devices 2 and 3 approximately in synchronism with the start of an open period of the shutter (not shown) (substep S14(E)). The main flash command that is sent at substep S14(E) corresponds to the main flash command that is sent at substep S6(E) in the first embodiment.

Next, processes that are executed in the first and second flash devices 2 and 3 will be described.

First, the radio receiving part 19 of the first flash device 2 receives the unique identification code of the camera 1 (step R11 in FIG. 12).

Step R11 in FIG. 12 consists of substeps R11(A), R11(C), and R11(D) that are executed in this order. At substep R11(A), the first flash device 2 receives the unique identification code of the camera 1.

At substep R11(C), in the first flash device 2, the collating section 37 collates the identification code received from the camera 1 with the unique identification code of the camera 1 that is stored in the first flash device 2. If the received identification code coincides with the stored unique identification code, the process goes to substep R11(D). That is, the flash control section 37A controls flashing (i.e., passes a flash command to the flash body unit 16) in response to a coincidence output from the collating section 37.

As a result, the first flash device 2 recognizes that the signal has been sent from the camera 1 of the second photographing system T2. This makes it possible to prevent radio interference because the first flash device 2 does not respond to a signal sent from the camera of another photographing system.

The camera 1 confirms that the code and the command have been received by the first flash device 2 at substeps R11(A), R11(B), and R11(D), and step R12 by the first flash device 2's emitting a main flash; the first flash device 2 does not send, to the camera 1, any replies to the effect that the code or command has been received.

On the other hand, the second flash device 3 executes step R14 in FIG. 12, which corresponds to step R11 in FIG. 12 that is executed in the first flash device 2. Step R14 in FIG. 12 consists of substeps R14(A), R14(C), and R14(D) that are executed in this order. Since the first and second flash devices 2 and 3 have the same configuration, the process that is executed in the second flash device 3 will not be described any further. After the preliminary flashing, the main flashing will be performed.

The emission of main flashes and the operations performed thereafter are the same as in the first embodiment, and hence will not be described.

The second embodiment provides the following advantages in addition to advantages like the ones of the first embodiment.

Each of the first and second flash devices 2 and 3 can recognize that a signal has been sent from the camera 1 of the second photographing system T2 to which the first and second flash devices 2 and 3 belong by the collating section 37's collating an identification code unique to the camera 1 transmitted by a radio communication with the unique identification code of the camera 1 stored in each of the first and second flash devices 2 and 3. The time necessary for the preparation for flashing can be shortened because no collation is performed on the unique identification codes of the first and second flash devices 2 and 3.

Embodiment 3

FIGS. 13–16 show a photographing system and a photographic information transmission system according to a third embodiment of the invention. In this embodiment, the first hand-held terminal is a camera and the second hand-held terminals are flash devices. The photographing system is an example of the photographic information transmission system.

A third photographing system T3 is composed of a single camera and flash devices that are a plurality of (two in this embodiment) slaves as accessories of the camera 1.

The third photographing system T3 is basically the same in configuration as the first photographing system T1 according to the first embodiment. Only the differences will be described below.

As shown in FIG. 13, a memory 41 of the camera 1 has a camera-side code registration unit 42 and a program storing area 43. Identifying codes (identifiers) that are unique to the first and second flash devices 2 and 3, respectively, are stored in the camera-side code registration unit 42. The program storing area 43 contains a program E indicating radio transmission procedures of preliminary flashing and main flashing.

The memory 44 of the first flash device 2 has a flash-side code registration unit 45 and a program storing area 46.

The identification code (identifier) that is unique to the first flash device 2 is stored in the flash-side code registration unit 45 of the first flash device 2. The flash-side code registration unit 45 is connected temporarily to the camera-side code registration unit 42 of the camera 1 via the connecting cord 23 or the contact points 23A and 23B (shown in FIG. 7).

The program storing area 46 contains a program F indicating radio reception procedures of preliminary flashing and main flashing. The program F also indicates procedures of a collating section 47 and a flash control section 47A. The collating section 47 collates the unique identification code of the first flash device 2 stored in the flash-side code registration unit 45 with an identification code unique to the first flashing device 2 sent from the camera 1 by radio waves (a transmission medium). The flash control section 47A controls flashing in response to a coincidence output of the collating section 47.

The second flash device 3 is basically the same in configuration as the first flash device 2, and is different from the first flash device 2 in that the unique identification code (identifier) of the second flash device 3 is stored in the flash-side code registration unit 45 of the second flash device 3.

Next, the operation of this embodiment will be described.

In the third photographing system T3, flash photographing is performed in the following manner in order of (1) preparatory operations, (2) preliminary flashing, and (3) main flashing.

(1) Preparatory Operations

Figure 14:
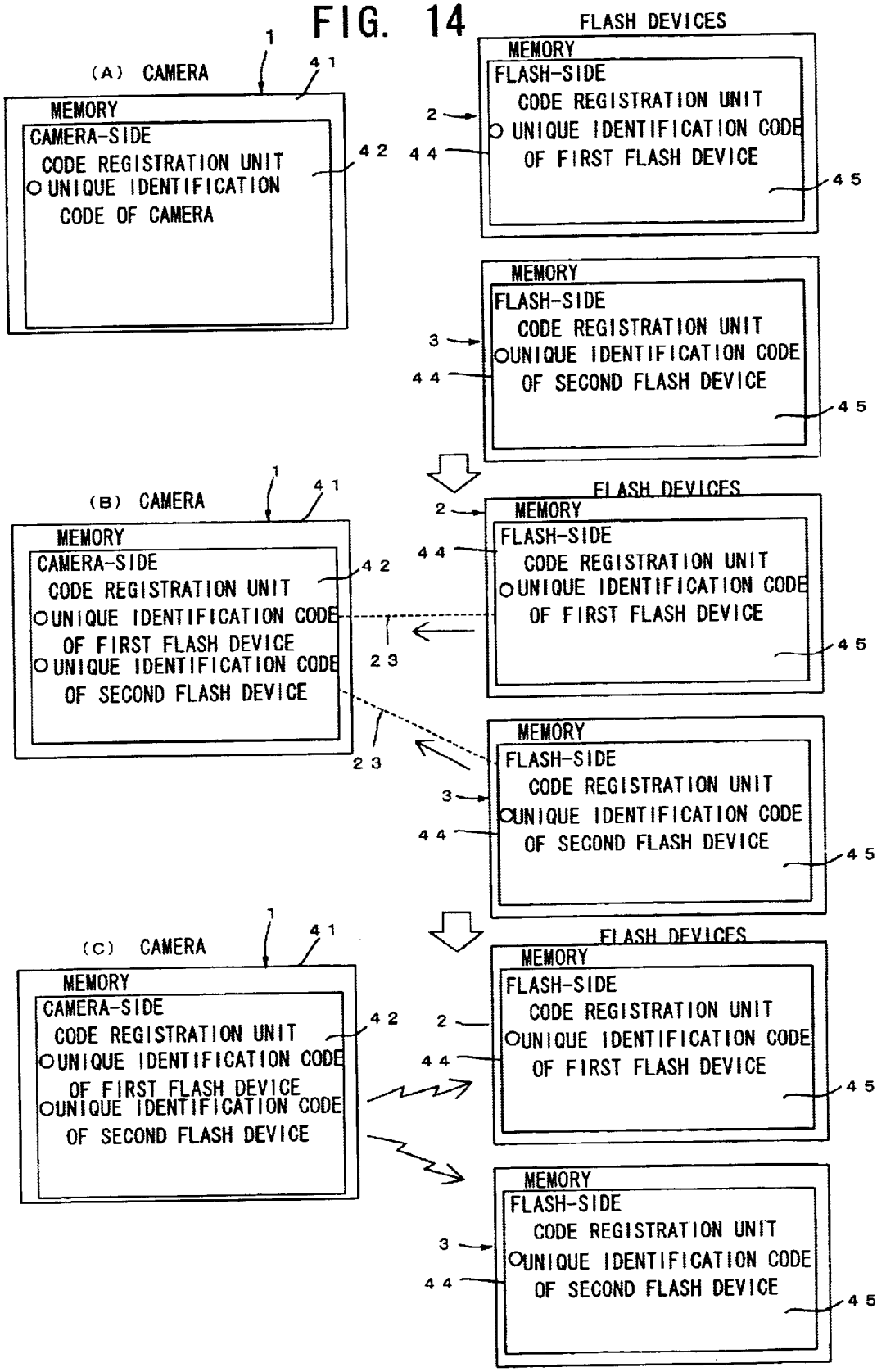
FIG. 14 illustrates how unique identification codes are communicated to and stored in the camera-side memory and flash-device-side memories shown in FIG. 13.

The preparatory operations of the third photographing system T3 will be described below with reference to FIG. 7 and FIG. 14.

As shown in FIG. 14(A), no data are stored in the camera-side code registration unit 42 of the memory 41 of the camera 1. The identification codes of the respective flash devices 2 and 3 are stored in the flash-side code registration units 45 of the memories 44 of the flash devices 2 and 3, respectively.

As shown in FIGS. 7 and 14(B), the camera 1 and the first flash device 2 are connected to each other temporarily via the connecting cord 23 or the contact points 23A and 23B. In this state, the setting button 6 of the camera 1 is depressed, whereupon a communication is performed between the camera 1 and the first flash device 2 via the connecting cord 23 or the contact points 23A and 23B.

The unique identification code of the first flash device 2 is registered in the camera-side code registration unit 42 of the camera 1 via the connecting cord 23 or the contact points 23A and 23B. That is, the unique identification code of the first flash device 2 is sent from the first flash device 2 to the camera 1 as indicated by an arrow in FIG. 14B and stored in the camera-side code registration unit 42 of the camera 1.

Similarly, the camera-side code registration unit 42 of the camera 1 and the flash-side code registration unit 45 the second flash device 3 are connected to each other temporarily via the connecting cord 23 or the contact points 23A and 23B, and the unique identification code of the second flash device 3 is stored in the camera-side code registration unit 42 of the camera 1. FIG. 14(B) shows this state.

After the above preparatory operations, the third photographing system T3 performs flash photographing.

Flash photographing starts when the photographer depresses the shutter button 5. After radio communications are performed in a manner shown in FIGS. 3, 14(C), and 15 or 16, the first and second flash devices 2 and 3 emit flashes (preliminary flashes or main flashes). FIG. 14(C) shows a state that the camera 1 is sending control signals for preliminary flashing or main flashing to the first and second flash devices 2 and 3.

The preliminary flashing and the main flashing will be described below with reference to FIGS. 3 and 13–16.

(2) Preliminary Flashing

First, a process that is executed in the camera 1 will be described.

Figure 15:
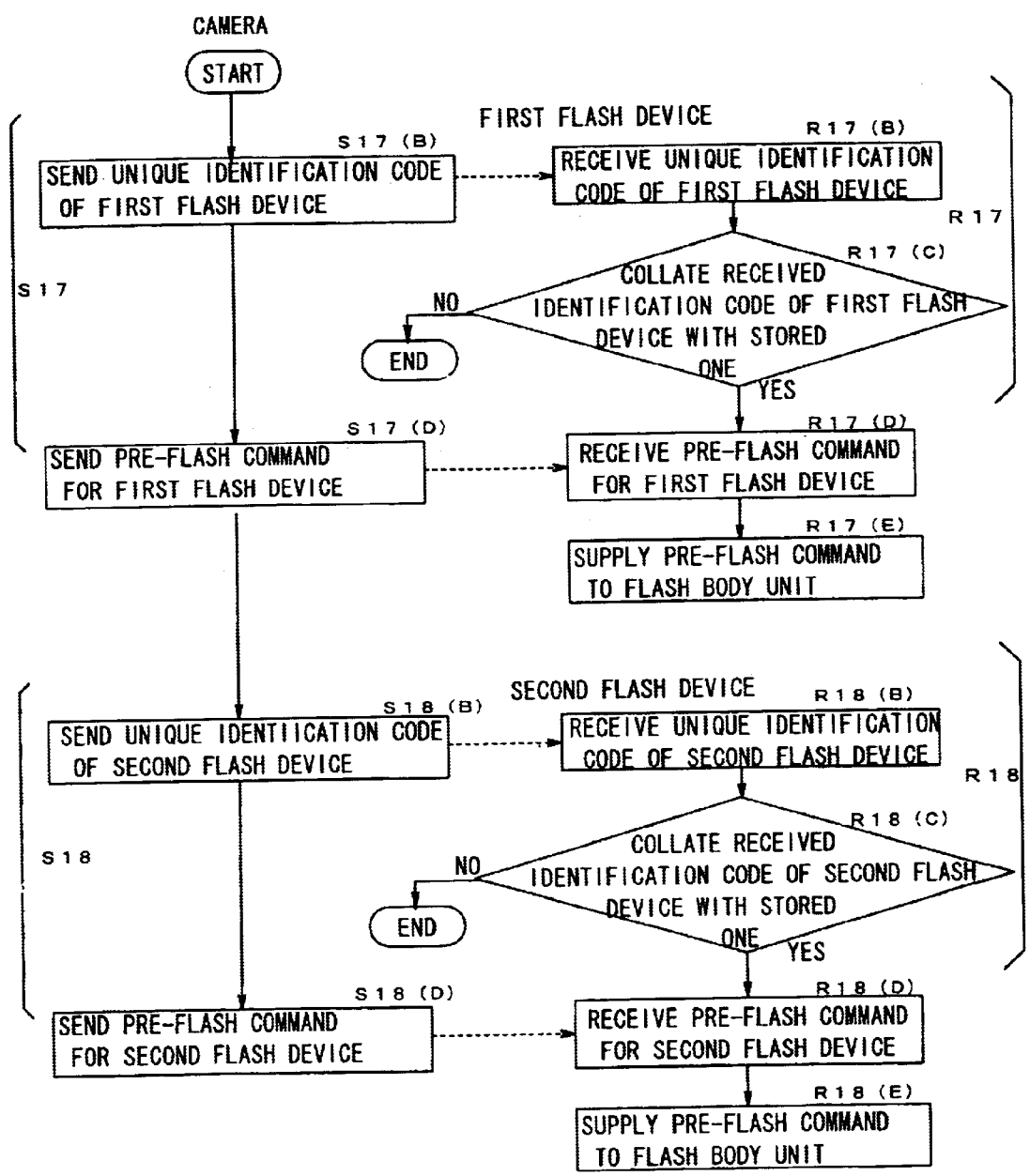
FIG. 15 is a flowchart showing a preliminary flashing process according to the third embodiment.

In the third photographing system T3, control signals are sent from the radio transmitting part 12 of the camera 1 to the radio receiving part 19 of the first flash device 2 by radio waves (a transmission medium) (step S17 in FIG. 15). Step S17 in FIG. 15 consists of substeps S17(B) and S17(D) that are executed in this order. That is, control signals of the unique identification code of the first flash device 2 (S17(B)) and a flash command for the first flash device 2 (S17(D)) are sent in this order.

Then, control signals are sent from the radio transmitting part 12 of the camera 1 to the radio receiving part 19 of the second flash device 3 by radio waves (a transmission medium) (step S18 in FIG. 15). Step S18 in FIG. 15 consists of substeps S18(B) and S18(D) that are executed in this order. That is, control signals of the unique identification code of the second flash device 3 (S18(B)) and a flash command for the second flash device 3 (S18(D)) are sent in this order.

Next, processes that are executed in the first and second flash devices 2 and 3 will be described.

Since the first and second flash devices 2 and 3 have the same configuration, only step R17 that is executed in the first flash device 2 will be described below. Step R18 shown in FIG. 15 that is executed in the second flash device 3 will not be described below.

The radio receiving part 19 of the first flash device 2 receives the unique identification codes of the second flash device 3 (step R17 in FIG. 15).

Step R17 consists of substeps R17(B), R17(C), R17(D), and R17(E) that are executed in this order. At substep R17(B), the first flash device 2 receives the unique identification code of the first flash device 2.

At substep R17(C), the collating section 47 collates the identification code received from the camera 1 with the unique identification code of the first flash device 2 that is stored in the first flash device 2 itself. If the received identification code coincides with the stored unique identification code, the process goes to substep R17(D). That is, the flash control section 47A controls flashing (i.e., passes a flash command to the flash body unit 16) in response to a coincidence output from the collating section 47.

As a result, the first flash device 2 recognizes that it corresponds to the camera 1 of the third photographing system T3. This makes it possible to prevent radio interference because the first flash device 2 does not respond to a signal sent from the camera of another photographing system.

At substep R17(E), the radio receiving part 19 outputs a pre-flash command to the flash body unit 16.

Receiving the pre-flash command, the flash body unit 16 emits a preliminary flash to the object H. That is, the first flash device 2 emits the preliminary flash.

The emission of preliminary flashes and the operations performed thereafter are the same as in the first embodiment, and hence will not be described.

The flash photographing then makes a transition to the main flashing as in the case of the first photographing system T1 according to the first embodiment.

(3) Main Flashing

First, a process that is executed in the camera 1 will be described.

Figure 16:
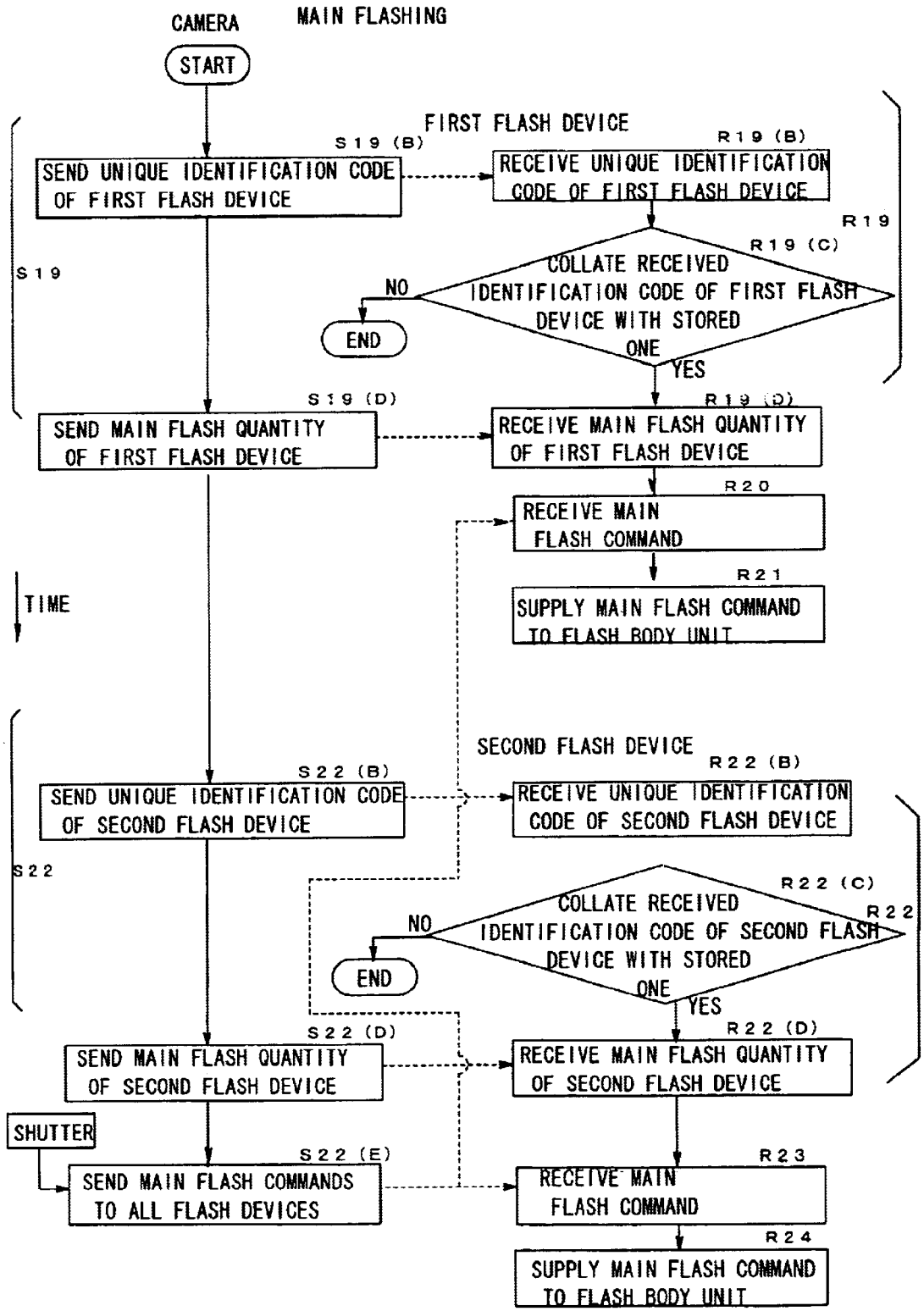
FIG. 16 is a flowchart showing a main flashing process according to the third embodiment.

As shown in FIG. 16, control signals are sent from the radio transmitting part 12 of the camera 1 to the radio receiving part 19 of the first flash device 2 by radio waves (a transmission medium) (step S19 in FIG. 16). Step S19 in FIG. 16 consists of substeps S19(B) and S19(D) that are executed in this order. That is, control signals of the unique identification code of the first flash device 2 (S19(B)) and a main flash quantity of the first flash device 2 (S19(D)) are sent in this order.

The main flash quantity that is sent at substep S19(D) is a quantity that has been calculated by the flash determining circuit 111 based on a quantity of reflected light detected by the light-receiving element 7.

Then, control signals are sent from the radio transmitting part 12 of the camera 1 to the radio receiving part 19 of the second flash device 3 by radio waves (a transmission medium) (step S22 in FIG. 16). Step S22 in FIG. 16 consists of substeps S22(B) and S22(D) that are executed in this order. That is, control signals of the unique identification code of the second flash device 3 (S22(B)) and a main flash quantity of the second flash device 3 (S22(D)) are sent in this order.

As shown in FIGS. 3 and 16, after a lapse of a time Δt from the depression of the shutter button 5, main flash commands are sent simultaneously from the radio transmitting part 12 of the camera 1 to the radio receiving parts 19 of the first and second flash devices 2 and 3 approximately in synchronism with the start of an open period of the shutter (not shown) (substep S22(E)). The main flash command that is sent at substep S22(E) corresponds to the main flash command that is sent at substep S6(E) in the first embodiment.

Next, processes that are executed in the first and second flash devices 2 and 3 will be described.

First, the radio receiving part 19 of the first flash device 2 receives the unique identification code of the first flash device 2 (step R19 in FIG. 16).

Step R19 in FIG. 16 consists of substeps R19(B), R19(C), and R19(D) that are executed in this order. At substep R19(B), the first flash device 2 receives the unique identification code from the camera 1.

At substep R19(C), in the first flash device 2, the collating section 47 collates the identification code received from the camera 1 with the unique identification code of the first flash device 2 that is stored in the first flash device 2 itself. If the received identification code coincides with the stored unique identification code, the process goes to substep R19(D). That is, the flash control section 47A controls flashing (i.e., passes a flash command to the flash body unit 16) in response to a coincidence output from the collating section 47.

As a result, the first flash device 2 recognizes that the signal has been sent from the camera 1 of the third photographing system T3. This makes it possible to prevent radio interference because the first flash device 2 does not respond to a signal sent from the camera of another photographing system.

On the other hand, the second flash device 3 executes step R22 in FIG. 16. Since the first and second flash devices 2 and 3 have the same configuration, step R22 in FIG. 16 that consists of substeps R22(B), R22(C), and R2(D) and is executed in the second flash device 3 will not be described any further.

Then, main flash commands are sent simultaneously from the radio transmitting part 12 of the camera 1 to the radio receiving parts 19 of the first and second flash devices 2 and 3 (substep S22(E) in FIG. 16) and the radio receiving parts 19 of the first and second flash devices 2 and 3 receive the main flash commands simultaneously (steps R20 and R23). The main flash commands are output from the radio receiving parts 19 to the flash body units 16 via the CPUs 17, respectively (steps R21 and R24). The flash body units 16 emit main flashes to the object H.

After the first and second flash devices 2 and 3 stop emitting the main flashes, the shutter of the camera 1 is closed. The flash photographing is thus completed.

The third embodiment provides the following advantages in addition to advantages like the ones of the first embodiment.

Each of the first and second flash devices 2 and 3 can recognize that a signal has been sent from the camera 1 of the third photographing system T3 to which the first and second flash devices 2 and 3 belong by the collating section 47's collating an identification code transmitted by a radio communication with the unique identification code of the first flash device 2 or the second flash device 3 stored in itself. The time necessary for the preparation for flashing can be shortened and the response speed can thereby be increased because no collation is performed on the unique identification code of the camera 1.

Transmission control procedures that are different from the transmission control procedures of each of the above-described photographing systems T1–T3 will be described below with reference to FIGS. 17–21 by using a modification of the first photographing system T1.

Figure 17:
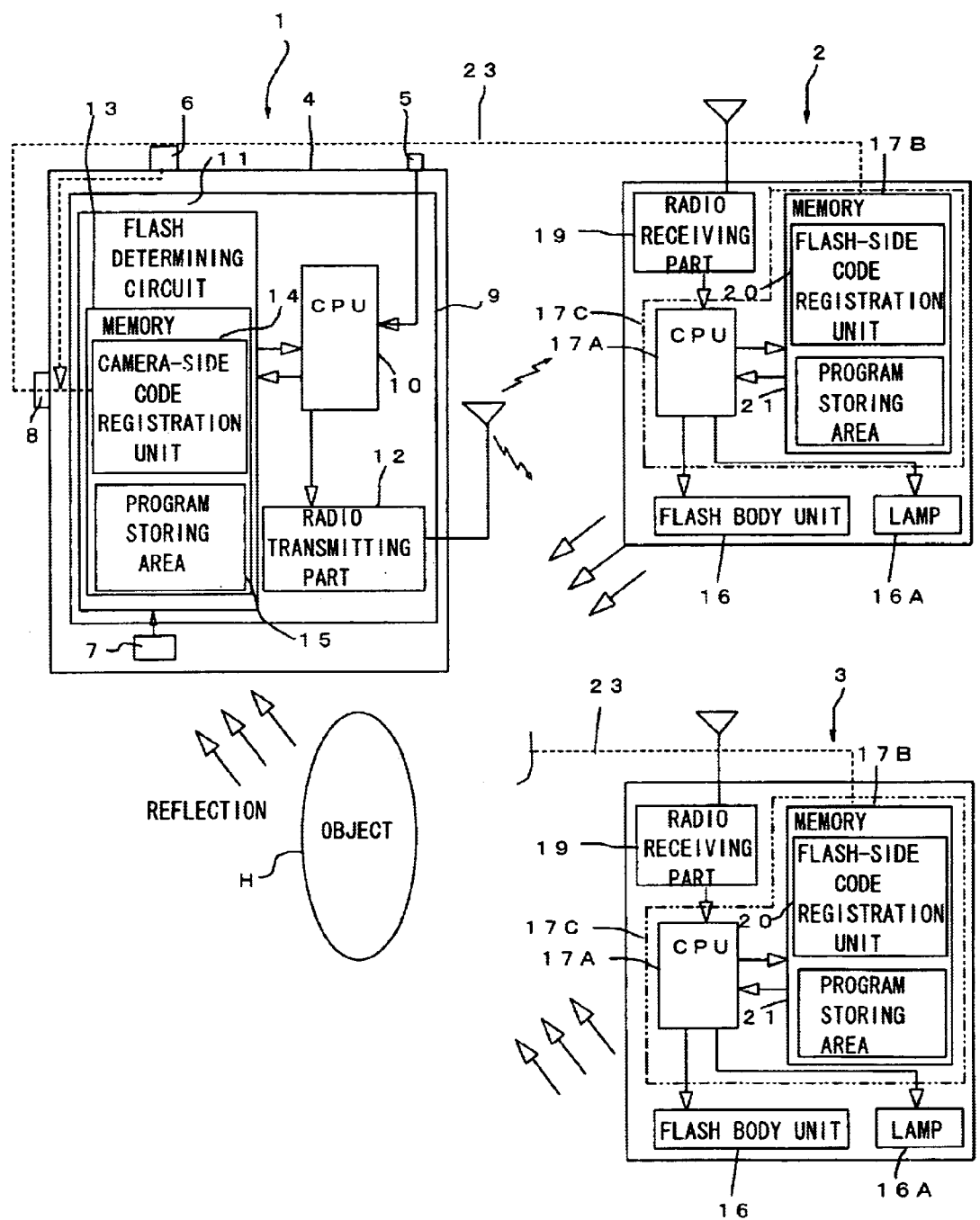
FIG. 17 is a block diagram showing a modification of the first photographing system according to the first embodiment.
Figure 18:
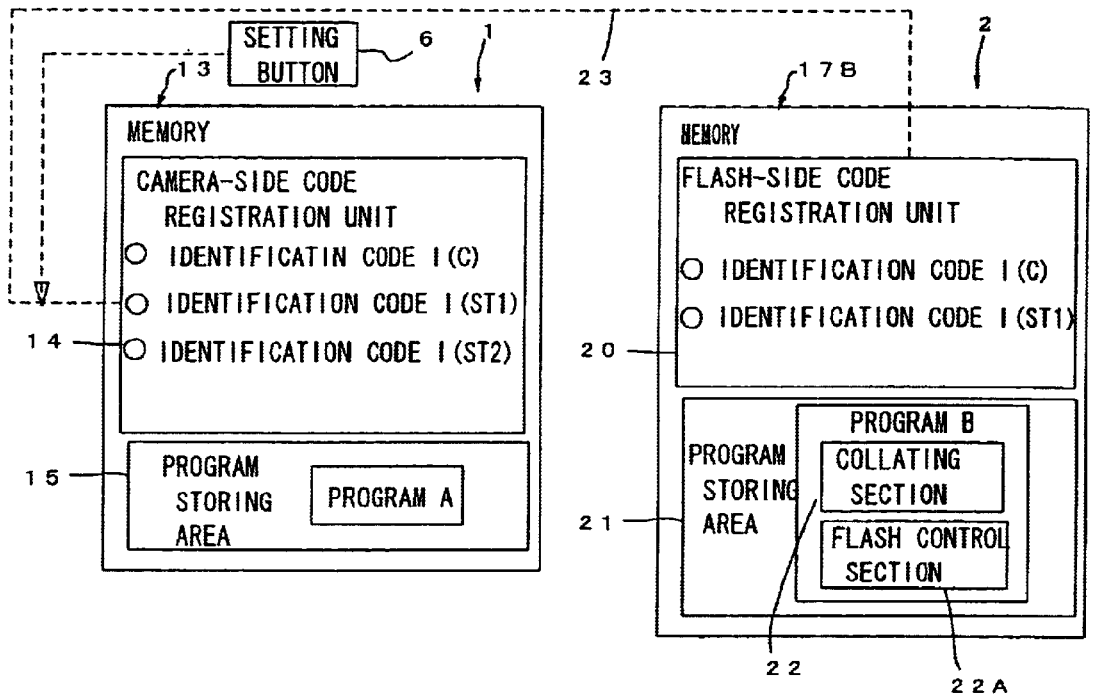
FIG. 18 shows the details of a camera-side memory and a flash-device-side memory shown in FIG. 17.

FIG. 17 is a block diagram showing the configuration of the modification of the first photographing system T1, for which the different transmission control procedures will be described. FIG. 18 shows the details of a camera-side memory and a flash-device-side memory shown in FIG. 17.

Figure 19:
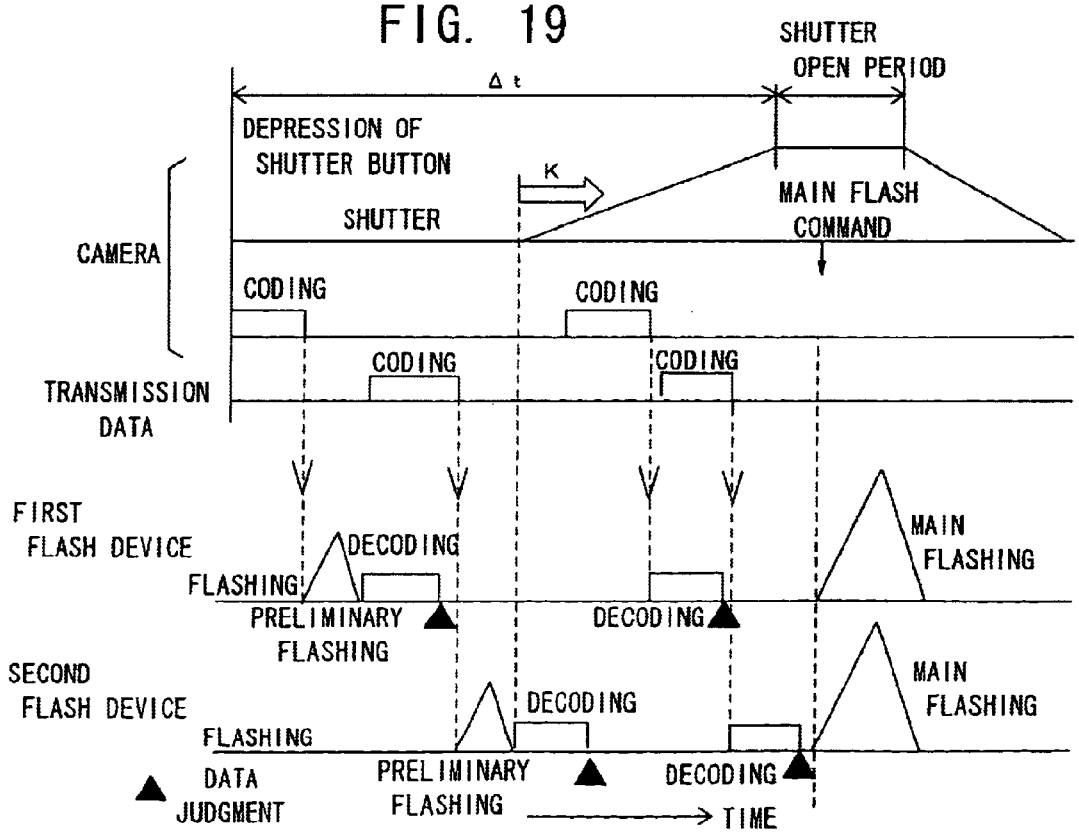
FIG. 19 is a timing chart showing how a camera and flash devices operate according to transmission control procedures that are different from the ones described above.
Figure 20:
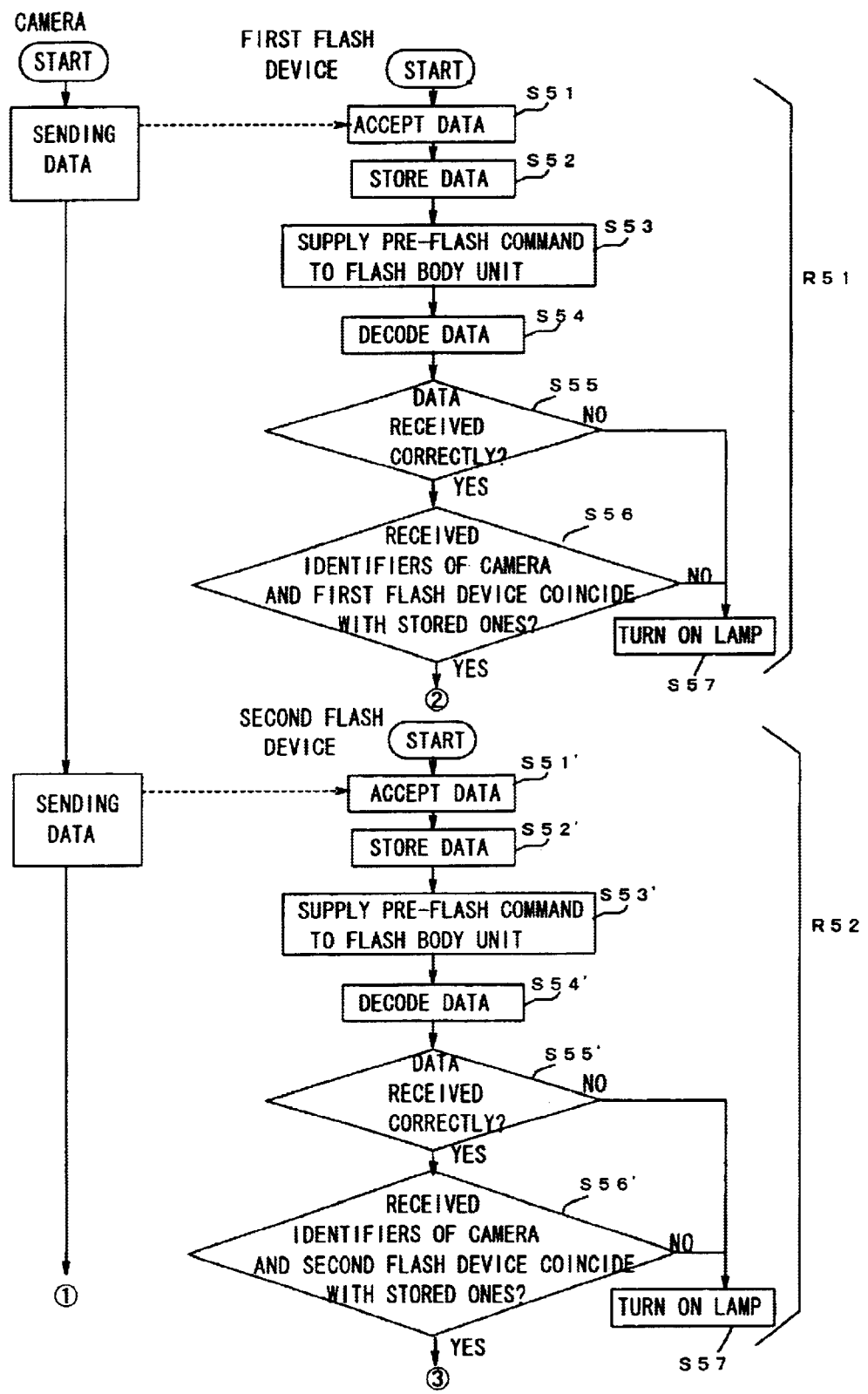
FIG. 20 is a flowchart showing a preliminary flashing process according to the different transmission control procedures.
Figure 21:
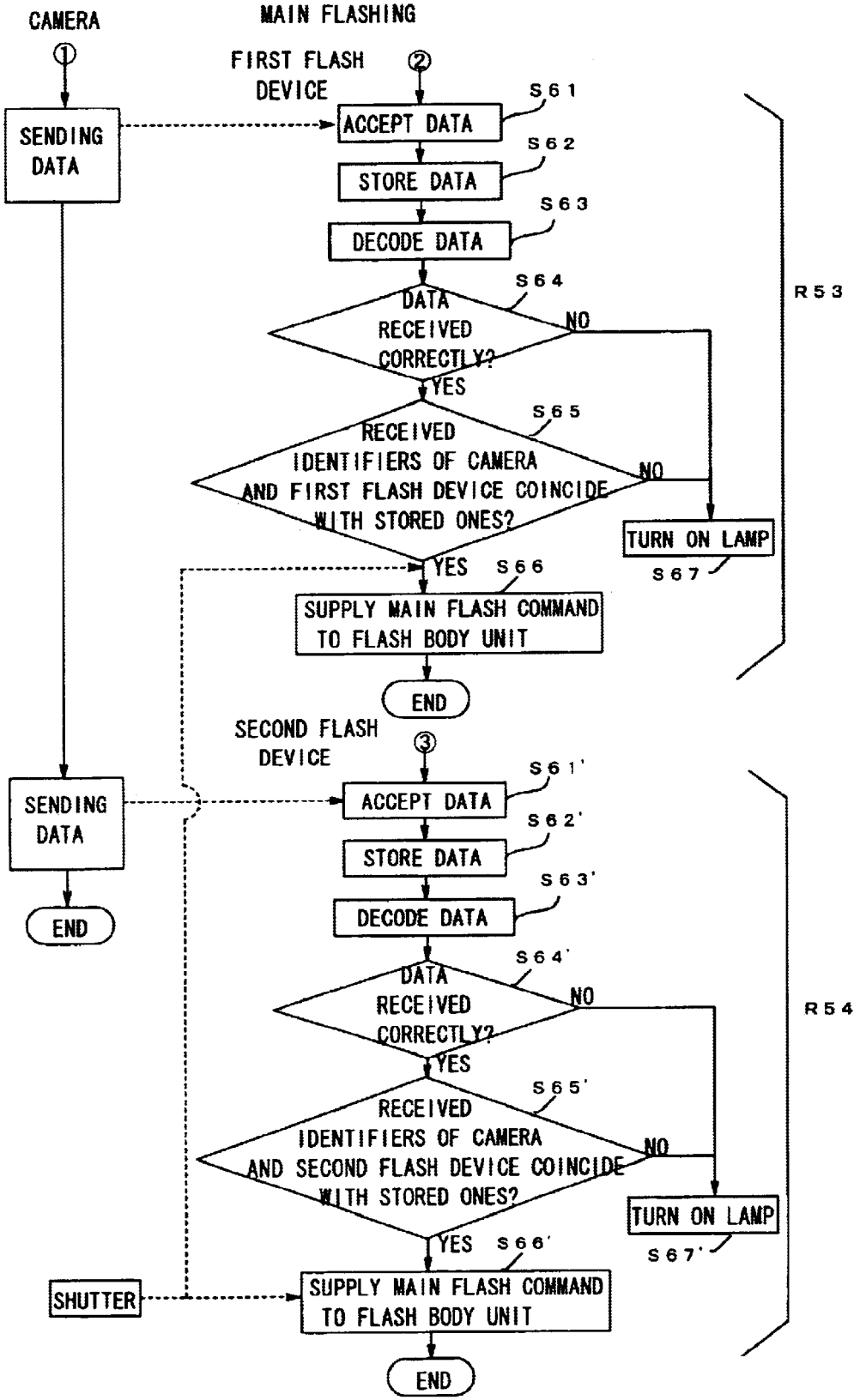
FIG. 21 is a flowchart showing a main flashing process according to the different transmission control procedures.

FIG. 19 is a timing chart showing how a camera and flash devices operate according to the transmission control procedures. FIG. 20 is a flowchart showing a preliminary flashing process according to the different transmission control procedures. FIG. 21 is a flowchart showing a main flashing process according to the different transmission control procedures.

As shown in FIGS. 17 and 18, identification codes (identifiers) that are an identification code I(C) that is unique to a camera 1 (to be referred to as identification code I(C), an identification code I(ST1) that is unique to a first flash device 2 (to be referred to as identification code I(ST1), and an identification code I(ST2) that is unique to a second flash device 3 (to be referred to as identification code ST1) are stored in a camera-side code registration unit 14 (see FIG. 18). Each of the identification codes I(C), I(ST1), and I(ST2) is, for example, a 4-bit code obtained by coding.

In preliminary flashing, a radio transmitting part 12 sends, to the first and second flash devices 2 and 3, a baseband signal including first data (described later) that is, for example, a 4-bit code obtained by coding and an error correcting code (e.g., 64 bits) added to it. In main flashing, the radio transmitting part 12 sends, to the first and second flash devices 2 and 3, a baseband signal including second data (described later) that is, for example, a 4-bit code obtained by coding and an error correcting code (e.g., 64 bits) added to it.

The error correcting code is to detect and correct an error in the codes indicating the identification codes I(C), I(ST1), and I(ST2) and a pre-flash command or a main flash command.

The first flash device 2 has a flash body unit 16 for emitting a flash, a controller 18 including a (C)PU 17A and a memory 17B, a radio receiving part 19 having a shift register (not shown), and a lamp 16A.

The memory 17B has a flash-side code registration unit 20 and program storing area 21. The identification codes I(ST1) and I(C) are stored in the flash-side code registration unit 20.

The memory 17B can be connected temporarily to a hot shoe 8 of the camera 1 via a connecting cord 23 or the contact points 23A and 23B (shown in FIG. 7) by the photographer's manipulation.

As described later, the lamp 16A turns on when radio waves have not been received correctly by the first flash device 2 or identification code non-coincidence has occurred in collation.

The second flash device 3 is basically the same in configuration as the first flash device 2, and is different from the first flash device 2 in that the identification codes I(ST2) and I(C) are stored in the flash-side code registration unit 20 of the second flash device.

In the photographing system T1, flash photographing is performed in the following manner in order of (1) preparatory operations, (2) preliminary flashing, and (3) main flashing.

(1) Preparatory Operations

The preparatory operations are the same as performed in the first photographing system T1, and hence will not be described.

After the preparatory operations, the photographing system performs flash photographing.

Flash photographing starts when the photographer depresses the shutter button 5.

After the camera 1 controls the first and second flash devices 2 and 3 using radio waves, the first and second flash devices 2 and 3 emit flashes (preliminary flashes or main flashes).

The preliminary flashing and the main flashing will be described below with reference to FIGS. 20 and 21, respectively.

(2) Preliminary Flashing

First, a process that is executed in the camera 1 will be described.

First data is coded in the radio transmitting part 12 of the camera 1.

The first data consists of the identification codes I(C), I(ST1), and I(ST2) and a pre-flash command. The pre-flash command is a command for causing the first flash devices 2 or 3 to emit a preliminary flash.

A baseband signal including the coded first data and an error correcting code is transmitted from the radio transmitting part 12 of the camera 1 to the radio receiving part 19 of the first flash device 2 by digital transmission using radio waves (a transmission medium).

Next, processes that are executed in the first and second flash devices 2 and 3 will be described.

Since the first and second flash devices 2 and 3 have basically the same configuration, only step R51 that is executed in the first flash device 2 will be described below. Step R52 shown in FIG. 20 that is executed in the second flash device 3 will not be described below.

The following process is executed in the first flash device 2.

At step S51, the baseband signal including the coded first data and the error correcting code are accepted serially by a shift register of the radio receiving part 19.

At step S52, the baseband signal is subject to serial-to-parallel conversion by the shift register and then stored in the memory 17B.

At step S53, the pre-flash command is output from the flash control section 22A to the flash body unit 16. Receiving the pre-flash command, the flash body unit 16 emits a preliminary flash to the object H.

The light-receiving element 7 of the camera 1 detects a quantity of reflected light produced by the object H's reflecting the preliminary flash.

The first data is decoded at step S54.

Since as described above the first data is decoded after the emission of preliminary flashes in the first and second flash devices 2 and 3, the camera 1 can perform certain processing K (see FIG. 19) that is specific to the camera 1 before the end of the decoding processing after the emission of preliminary flashes by the first and second flash devices 2 and 3. That is, the camera 1 can use the decoding periods of the first and second flash devices 2 and 3 as extra times to perform the processing K that is specific to the camera 1; the design freedom increases accordingly.

At step S55, it is judged whether the decoded first data is data that has been received correctly. If the judgment result is "no," the lamp 16A turns on at step S57 to warn the photographer.

If the judgment result is "yes," the process goes to step S56, where the collating section 22 collates the identification codes I(C) and I(ST1) that have been received from the camera 1 with those stored in the first flash device 2.

If the received identification codes do not coincide with the stored ones, the lamp 16A turns on at step S57 to warn the photographer.

If the received identification codes coincide with the stored ones, the controller 18 waits for the next command that will be received from the camera 1.

As described above, the camera 1 confirms that the signal has been received by the first flash device 2 by the light-receiving element 7's detecting a preliminary flash of the first flash device 2; the first flash device 2 does not send, to the camera 1, any replies to the effect that the signal has been received. That is, the preliminary flash plays the same role as a radio-wave reply for confirming reception of the signal would do.

The first flash device 2 thus recognizes that it corresponds to the camera 1 of the first photographing system T1 it belongs to, and hence does not respond to a signal from the camera of another photographing system; interference is thus prevented.

As described above, as shown in FIG. 19, the first flash device 2 emits the preliminary flash in response to the signal that is sent from the camera 1 to the first flash device 2. Subsequently, the second flash device 3 emits a preliminary flash in response to a signal that is sent from the camera 1 to the second flash device 3.

Reflected light produced by the object H's reflecting the preliminary flashes passes through the photographic lens (not shown) of the camera body unit 4 and is detected by the light-receiving element 7. The flash photographing then makes a transition to the main flashing.

(3) Main Flashing

First, a process that is executed in the camera 1 will be described.

Second data is coded in the radio transmitting part 12 of the camera 1.

The second data consists of the identification codes I(C), I(ST1), and I(ST2) and a main flash command. The main flash command contains a main flash quantity and information indicating timing of emitting a main flash. The main flash quantity is a quantity that has been calculated by the flash determining circuit 11 based on a quantity of reflected light that has been produced by the object H's reflecting the preliminary flash and detected by the light-receiving element 7, which is a quantity of light to be emitted from the flash body unit 16.

A baseband signal including the coded second data and an error correcting code is transmitted from the radio transmitting part 12 of the camera 1 to the radio receiving part 19 of the first flash device 2 by digital transmission using radio waves (a transmission medium).

As shown in FIG. 19, after a lapse of a time Δt from the depression of the shutter button 5 by the photographer, main flash commands are sent simultaneously from the radio transmitting part 12 of the camera 1 to the radio receiving parts 19 of the first and second flash devices 2 and 3 approximately in synchronism with the start of an open period of the shutter (not shown).

Next, processes that are executed in the first and second flash devices 2 and 3 will be described.

Since the first and second flash devices 2 and 3 have basically the same configuration, only step R53 that is executed in the first flash device 2 will be described below. Step R54 shown in FIG. 21 that is executed in the second flash device 3 will not be described below.

The following process is executed in the first flash device 2.

At step S61, the baseband signal including the coded second data and the error correcting code are accepted serially by the shift register of the radio receiving part 19.

At step S62, the baseband signal is subject to serial-to-parallel conversion by the shift register and then stored in the memory 17B.

The second data is decoded at step S63.

At step S64, it is judged whether the decoded second data is data that has been received correctly. If the judgment result is "no," the lamp 16A turns on at step S67 to warn the photographer.

If the judgment result is "yes," the process goes to step S65, where the collating section 22 collates the identification codes I(C) and I(ST1) that have been received from the camera 1 with those stored in the first flash device 2.

If the received identification codes do not coincide with the stored ones, the lamp 16A turns on at step S67 to warn the photographer.

If the received identification codes coincide with the stored ones, the flash control section 22A responds to a coincidence output from the collating section 22 and the process goes to step S66, where the flash control section 22A passes a flash command to the flash body unit 16.

The camera 1 confirms that the second data has been received by the first flash device 2 by a main flash of the first flash device 2; the first flash device 2 does not send, to the camera 1, any replies to the effect that the second data has been received. That is, the main flash plays the same role as a radio-wave reply for confirming reception of the second data would do.

The first flash device 2 thus recognizes that it corresponds to the camera 1 of the first photographing system T1 it belongs to, and hence does not respond to a signal from the camera of another photographing system; interference is thus prevented.

On the other hand, in the second flash device 3, step R54 shown in FIG. 21 is executed in the same manner as step R53 is done.

Then, main flash commands are sent simultaneously from the radio transmitting part 12 of the camera 1 to the radio receiving parts 19 of the first and second flash devices 2 and 3, and the radio receiving parts 19 of the first and second flash devices 2 and 3 receive the main flash commands simultaneously (steps R4 and R7). The main flash commands are output from the radio receiving parts 19 to the flash body units 16 via the CPUs 17, respectively. The flash body units 16 emit main flashes to the object H.

After the first and second flash devices 2 and 3 stop emitting the main flashes, the shutter of the camera 1 is closed. The flash photographing is thus completed.

The above-described first to third embodiments can be applied in the following manner.

First, although in the above embodiments the camera body unit 4 of the camera 1 incorporates the camera-side code registration unit 14 and the radio transmitting part 12, the camera 1 may be configured in such a manner that the camera-side code registration unit 14 and the radio transmitting part 12 are external units of the camera body unit 4. This makes it possible to apply the invention to existing cameras.

Second, although in the above embodiments the first and second flash devices 2 and 3 are provided separately from the camera 1, the former may be integrated with the latter.

Figure 8:
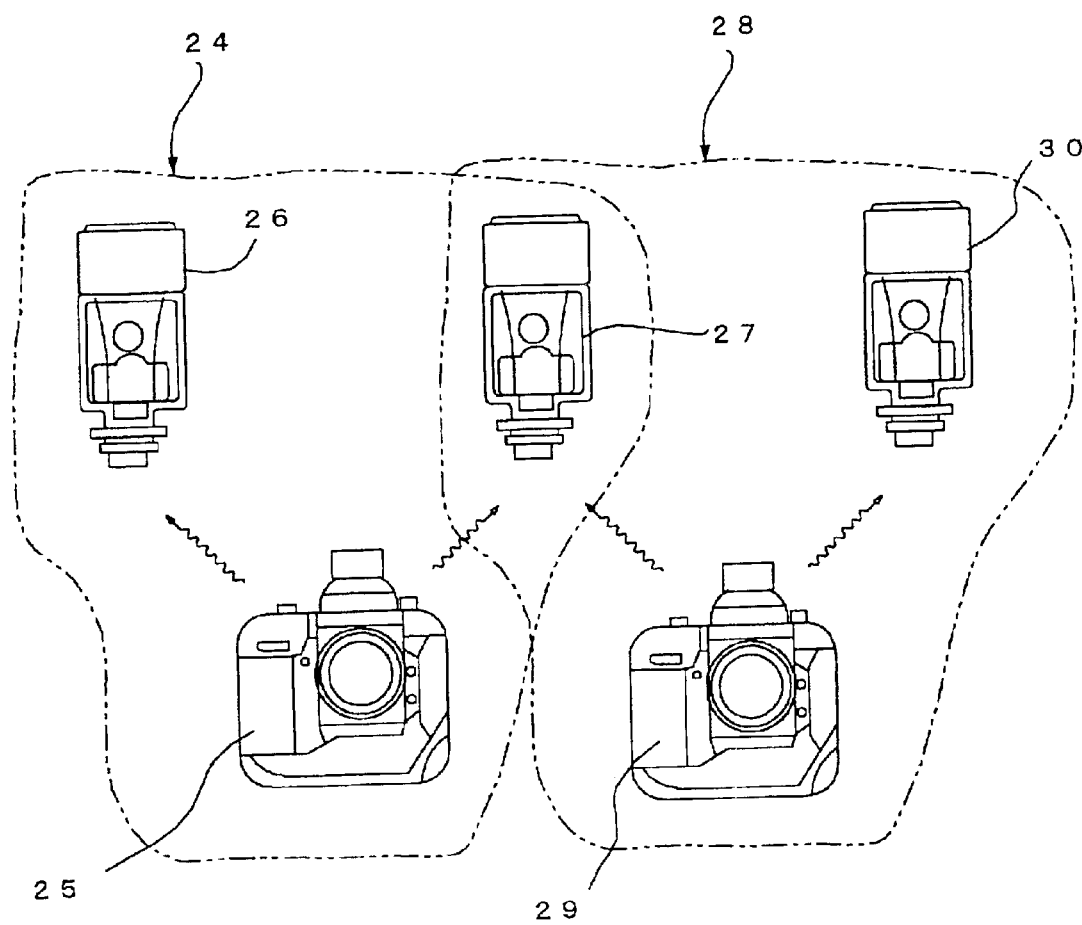
FIG. 8 shows a combination of two photographing systems to which the invention can be applied.

Third, although the above embodiments are such that the invention is applied to the photographing system T1 that consists of the single camera 1 and the first and second flash devices 2 and 3 as accessories of the camera 1, as shown in FIG. 8 the invention can also be applied to two photographing systems that share a flash device.

Specifically, a photographing system 24 consists of a camera 25 and flash devices 26 and 27 and a photographing system 28 consists of a camera 29, the flash device 27, and a flash device 30. The flash device 27 is so set as to be able to receive signals from both cameras 25 and 29.

When the two photographing systems 24 and 28 are used simultaneously, a unique identification code of the flash device 27 is transmitted from both cameras 25 and 29 to the flash device 27 that is set as a slave device of both cameras 25 and 29 by radio communications. Therefore, the flash device 27 serves for flash photographing of both photographing systems 24 and 28.

Fourth, in the above embodiments, a circuit for disregarding an attempt to again register the first and second flash devices 2 and 3 that are already registered in the camera 1 and issuing a warning signal may be added to the camera 1.

Fifthly, in the above embodiments, there may occur a case that it is desired to cancel a current relationship between a camera and flash devices and set a new combination of a camera and flash devices. To enable such re-setting, a circuit having a master/slave setting canceling function may be added to each of the camera 1 and the flash devices. In this case, when one of the flash devices 2 and 3 is temporarily connected to the camera 1 via the connecting cord 23 in the same manner as in registering a unique identification code to activate the master/slave setting canceling function of the camera 1, the unique identification codes of the camera 1 and the flash devices 2 and 3 stored in each of the camera-side code registration unit 14 of the camera 1 and the flash-side code registration unit 20 of the flash devices 2 and 3 are erased.

Sixthly, in the above embodiments, in a situation that flash photographing may not always be performed by using all flash devices whose identification codes are stored in a camera, a circuit for setting what part of the flash devices should be used for flash photographing may be added to the camera. In this case, the photographer cannot intuitively identify flash devices whose list is displayed on the camera if they are represented by model codes or serial numbers in the list. To avoid this problem, flash devices may be given short names that enable their easy recognition or they may be given such names as A, B, (C), . . . automatically in order of registration. Even if the photographer forgets correspondence between a flash device and its name, he can immediately recognize the correspondence by selecting the flash device alone and flashing it as a test.

Seventhly, the first to third embodiments are such that the first hand-held terminal is a camera and the second hand-held terminals are flash devices. However, the first hand-held terminal may be a device other than a camera such as a flash device, a cellular phone, or a PDA (personal digital assistant), and each second hand-held terminal may be a device other than a flash device such as a camera, a cellular phone, or a PDA.

For example, where the first hand-held terminal is a camera and the second hand-held terminals are cellular phones, photographic data can be sent from the camera to the cellular phones by radio waves in photographing by registering identification codes in advance in the same manner as in the photographing systems T1–T3 by temporarily connecting each cellular phone to the camera via a lead wire or contact points.

Embodiment 4

Figure 22:
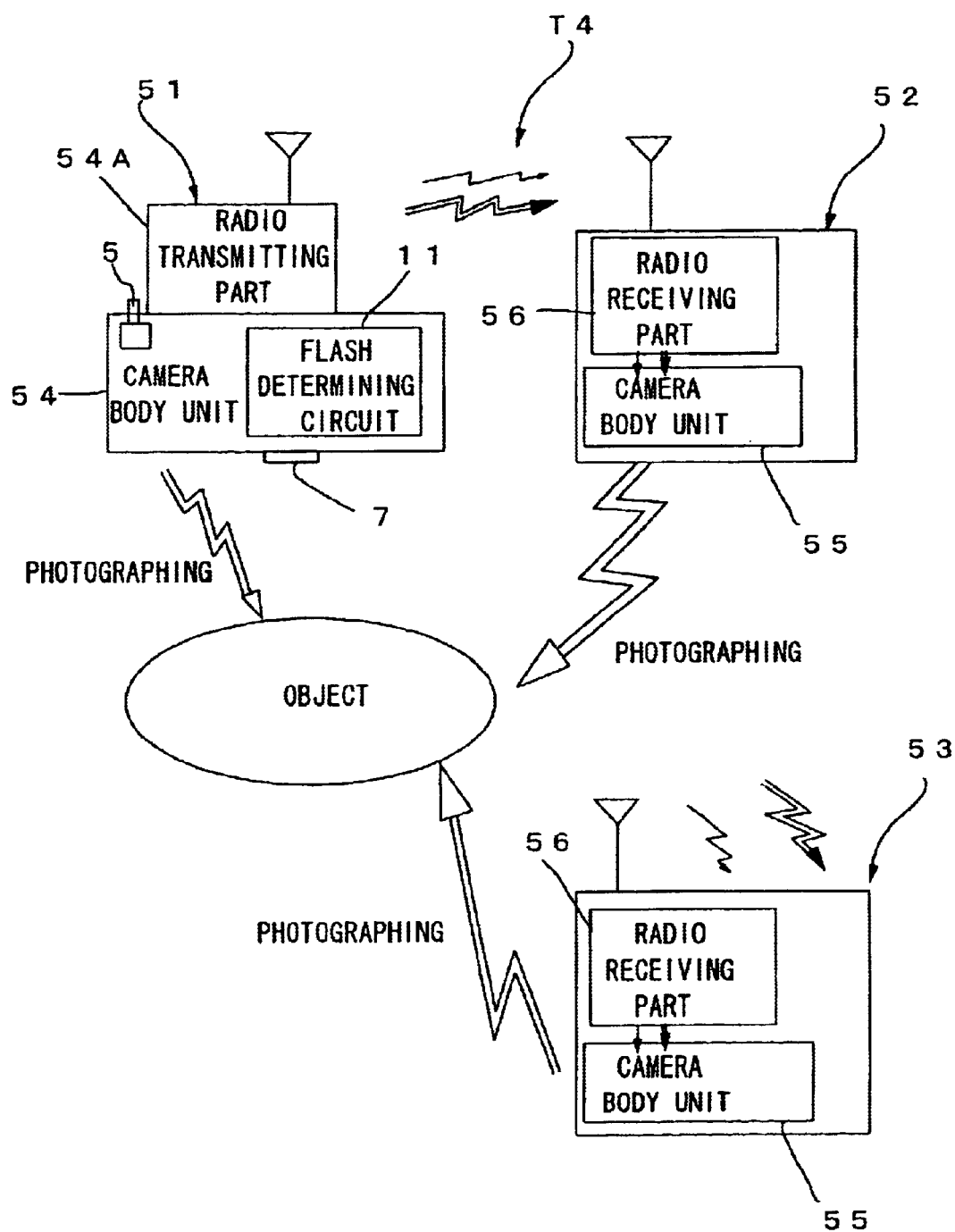
FIG. 22 is a block diagram showing the configuration of a photographic information transmission system according to a fourth embodiment of the invention.
Figure 23:
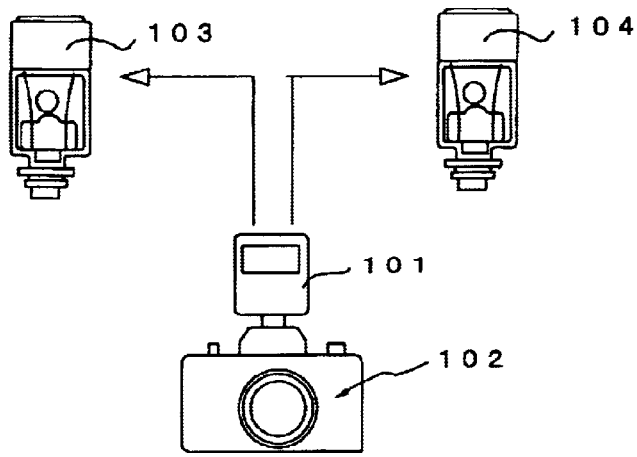
FIG. 23 illustrates a camera and a plurality of flash devices in a conventional photographing system.
Figure 24:
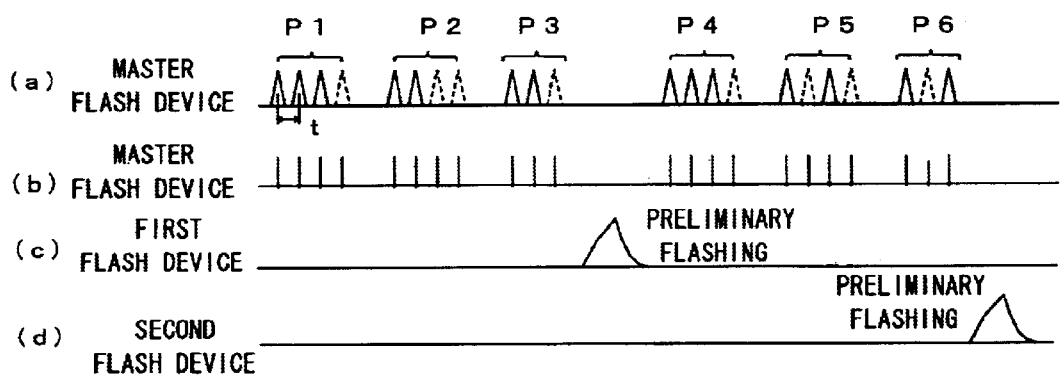
FIG. 24 is a timing chart showing preliminary flashing in the conventional photographing system of FIG. 23.
Figure 25:
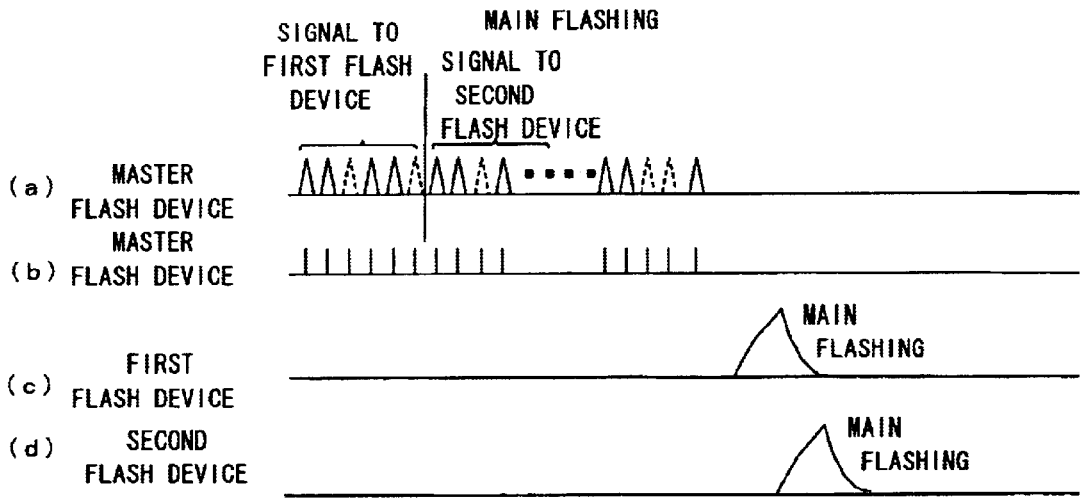
FIG. 25 is a timing chart showing main flashing in the conventional photographing system of FIG. 23.

FIG. 22 shows a photographic information transmission system according to a fourth embodiment of the invention in which each of the first hand-held terminal and the second hand-held terminal is a camera.

As shown in FIG. 22, the photographic information transmission system consists of a single master camera and a plurality of (in this embodiment, two) slave cameras as accessories of the master camera. The photographic information transmission system T4 is basically the same as the photographing system T1 of FIG. 1. Only the differences will be described below.

In FIG. 22, the master camera 51 has a plurality (two in the figure) of slave cameras 52, 53 as accessories.

The master camera 51 controls the slave cameras 52 and 53 by sending radio signals to the slave cameras 52 and 53 via unidirectional transmission channels.

The master camera 51 is basically the same in configuration as the camera 1 shown in FIG. 1. As for its major components, the camera 1 has a camera body unit 54 and a radio transmitting part 54A.

The camera body unit 54 is equipped with a light-receiving element 7 and a flash determining circuit 11 having a known flash quality determining function of determining the quality of flash on reflected light coming from an object H.

Each of the slave cameras 52 is equipped with a radio receiving part 56 and a camera body unit 55 not having a flash quality determining section such as a flash quality determining circuit.

The master camera 51 and the slave cameras 52 and 53 cooperate under the following control to perform simultaneous photographing operations.

(1) The photographer depresses the shutter button 5 halfway.

(2) The master camera 51 sends, to the slave cameras 52 and 53, baseband signals including first data for identification of the photographic information transmission system T4.

Figure 4:
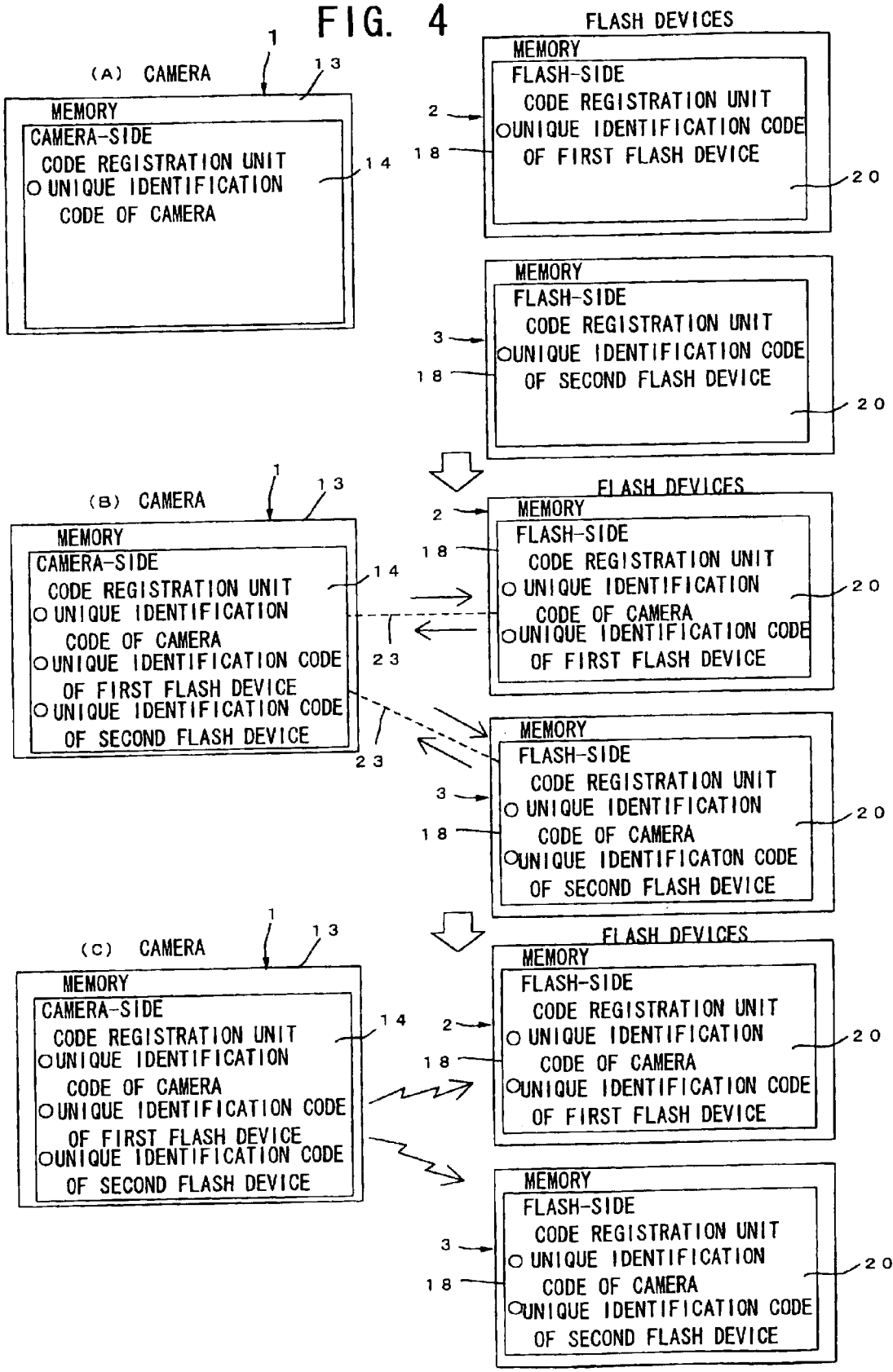
FIG. 4 illustrates how unique identification codes are communicated and stored in the camera-side memory and the flash-device-side memories shown in FIG. 1.

(3) The slave cameras 52 and 53 receive the baseband signals, and perform identification code collation in the same manner as shown in FIG. 4 and FIG. 5 to identify the photographic information transmission system T4 they belong to.

The master camera 51 confirms that the first data have been received by the slave cameras 52 and 53 by simultaneous photographing operations that are performed according to the following procedure though the slave cameras 52 and 53 do not send, to the master camera 51, any replies for confirming reception of the first data.

(4) The master camera 51 determines the quality of flash on reflected light coming from the object H and thereby determines the quality of light.

(5) The master camera 51 sends, to each of the slave cameras 52 and 53, a baseband signal containing second data for identification of the photographic information transmission system T4, the determined quality of light, and data indicating photographing timing. Receiving the baseband signal, each of the slave cameras 52 and 53 performs collation in the same manner as shown in FIG. 4 and FIG. 5 to identify the photographic information transmission system T4 it belongs to.

(6) When the photographer depresses the shutter button 5 completely, the master camera 51 sends, to the slave cameras 52 and 53, signals for opening the shutters of the respective slave cameras 52 and 53, whereupon the master camera 51 and the slave cameras 52 and 53 perform photographing operations simultaneously. In doing so, each of the slave cameras 52 and 53 uses the determined quality of light, the data indicating the photographing timing, etc. that have been sent from the master camera 51.

With the above configuration, simultaneous photographing operations can be performed with the plurality of cameras 51–53 in which only the master camera 51 determines the quality of flash (the slaves cameras 52 and 53 need not do so).

Another configuration is possible in which the first hand-held terminal is a PDA and the second hand-held terminals are a plurality of cameras. In this case, the PDA serves as a master and the cameras serve as slaves. The PDA sends signals to the cameras by unidirectional radio transmission.

By the unidirectional radio transmission, data for identification of the photographic information transmission system is transmitted at a first stage and data for identification of the photographic information transmission system, determined quality of flash, and data indicating photographing timing etc. are transmitted at a second stage. In this manner, the cameras are controlled by the PDA so as to operate simultaneously or with proper timing. Other various combinations are also possible as exemplified by a configuration in which a function of serving as a flash device is added to the PDA and each camera is equipped with a flash device.

The invention is not limited to the above embodiments and various modifications may be made without departing from the spirit and the scope of the invention. Any improvement may be made in part or all of the components.

What is claimed is:

1. A photographing system in which a flash device is controlled by a signal that is transmitted from a camera to the flash device through a communication medium, wherein:
   at least one of the camera and the flash device is provided with a unique identification code for identification of the camera or the flash device; and
   the flash device comprises a collating section for collating a unique identification code that is transmitted from the camera by making a physical connection between the camera and the flash device via lead wire or contact points, with a unique identification code originally provided in the flash device.

2. The photographing system according to claim 1, wherein:
   the flash device is provided with the unique identification code;
   the camera has, in advance, the unique identification code of the flash device transmitted by making the physical connection between the camera and the flash device via a lead wire or contact points, and in controlling the flash device the camera sends the unique identification code of the flash device to the flash device through the physical connection via the lead wire or the contact points, and
   the collating section collates the unique identification code of the flash device that is transmitted from the camera through the physical connection of the lead wire or the contact points to the flash device, with the unique identification code of the flash device provided in the flash device.

3. The photographing system according to claim 2, wherein
   the camera stores unique identification codes of a plurality of flash devices which are transmitted from the plurality of flash devices.

4. The photographing system according to claim 1, wherein
   the number of the flash devices is plural, and each of the plurality of flash devices independently stores the unique identification code of the camera.

5. A photographic information transmission system in which a signal relating to photographing is transmitted from a first hand-held terminal to a second hand-held terminal by transmission to control a second hand-held terminal, wherein:
   at least one of the first hand-held terminal and the second hand-held terminal is provided with a unique identification code for identification of the first hand-held terminal or the second hand-held terminal; and
   the second hand-held terminal comprises a collating section for collating a unique identification code that is transmitted from the first hand-held terminal by making a physical connection between the first and second hand-held terminals, with a unique identification code originally provided in the second hand-held terminal.

6. The photographic information transmission system according to claim 5, wherein
   the number of the second hand-held terminals is plural, and each of the plurality of the second hand-held terminals independently stores the unique identification code of the first hand-held terminal.

7. The photographic information transmission system according to claim 6, wherein
   the first hand-held terminal is a camera and the second hand-held terminal is a flash device.

8. The photographic information transmission system according to claim 6, wherein the first hand-held terminal is a camera and the second hand-held terminal is a cellular phone.

9. The photographic information transmission system according to claim 6, wherein the first hand-held terminal is a camera and the second hand-held terminal is a camera.

10. The photographic information transmission system according to claim 5, wherein
    the first hand-held terminal is a camera and the second hand-held terminal is a flash device.

11. The photographic information transmission system according to claim 5, wherein the first hand-held terminal is a camera and the second hand-held terminal is a cellular phone.

12. The photographic information transmission system according to claim 5, wherein the first hand-held terminal is a camera and the second hand-held terminal is a camera.

13. A photographic information transmission system in which a signal relating to photographing is transmitted from a first hand-held terminal, wherein:
    at least one of the first hand-held terminal and the second hand-held terminal is provided with a unique identification code for identification of the first hand-held terminal or the second hand-held terminal;
    the second hand-held terminal comprises a collating section for collating a unique identification code that is transmitted from the first hand-held terminal by making a physical connection between the first and second hand-held terminals via lead wire or contact points, with a unique identification code originally provided in the second hand-held terminal;
    the first hand-held terminal has the unique identification code of the second hand-held terminal transmitted in advance through the physical connection between the first hand-held terminal and the second hand-held terminal via a lead wire or contact points, and in controlling the second hand-held terminal the first hand-held terminal sends the unique identification code of the second hand-held terminal to the second hand-held terminal through the physical connection via the lead wire or the contact points; and
    the collating section collates the unique identification code of the second hand-held terminal that is transmitted from the first hand-held terminal through the physical connection via the lead wire or the contact points, with the unique identification code of the second hand-held terminal provided in the second hand-held terminal.

14. The photographic information transmission system according to claim 13, wherein
    the first hand-held terminal stores unique identification codes of a plurality of second hand-held terminals.

15. The photographic information transmission system according to claim 14, wherein
the first hand-held terminal is a camera and the second hand-held terminal is a flash device.

16. The photographic information transmission system according to claim 14, wherein the first hand-held terminal is a camera and the second hand-held terminal is a cellular phone.

17. The photographic information transmission system according to claim 14, wherein the first hand-held terminal is a camera and the second hand-held terminal is a camera.

18. The photographic information transmission system according to claim 13, wherein
the first hand-held terminal is a camera and the second hand-held terminal is a flash device.

19. The photographic information transmission system according to claim 13, wherein the first hand-held terminal is a camera and the second hand-held terminal is a cellular phone.

20. The photographic information transmission system according to claim 13, wherein the first hand-held terminal is a camera and the second hand-held terminal is a camera.

* * * * *